United States Patent
Hutchinson et al.

(10) Patent No.: US 7,332,204 B2
(45) Date of Patent: *Feb. 19, 2008

(54) COATED POLYESTER PREFORMS AND ARTICLES

(75) Inventors: Gerald A. Hutchinson, Coto de Caza, CA (US); Robert A. Lee, Bowdon Cheshire (GB)

(73) Assignee: Advanced Plastics Technologies Luxembourg S.A., Luxembourg (LU)

( * ) Notice: Subject to any disclaimer, the term of this patent is extended or adjusted under 35 U.S.C. 154(b) by 119 days.

This patent is subject to a terminal disclaimer.

(21) Appl. No.: 10/351,909

(22) Filed: Jan. 24, 2003

(65) Prior Publication Data

US 2003/0219555 A1 Nov. 27, 2003

Related U.S. Application Data

(60) Division of application No. 10/152,318, filed on May 20, 2002, now Pat. No. 6,676,883, which is a division of application No. 09/174,971, filed on Oct. 19, 1998, now Pat. No. 6,391,408, which is a continuation-in-part of application No. 08/953,595, filed on Oct. 17, 1997, now Pat. No. 6,312,641.

(60) Provisional application No. 60/078,641, filed on Mar. 19, 1998.

(51) Int. Cl.
*B29D 22/00* (2006.01)
*B29D 23/00* (2006.01)
*B32B 1/08* (2006.01)

(52) U.S. Cl. ............. 428/36.91; 428/35.7; 428/36.6; 428/36.7; 428/480; 428/483; 428/542.8

(58) Field of Classification Search ............. 428/36.6, 428/36.7, 480, 542.8, 903.3, 35.7, 36.91, 428/483
See application file for complete search history.

(56) References Cited

U.S. PATENT DOCUMENTS 3,224,043 A 12/1965 Lameris et al.
(Continued)

FOREIGN PATENT DOCUMENTS

DE 21 08 774 A 9/1971
(Continued)

OTHER PUBLICATIONS

Proceedings of 3$^{rd}$ International Conference on Rigid Polyester Packaging Innovations for Food and Beverages; Nova-Pak Americas '98; Jan. 26-27, 1998.
(Continued)

*Primary Examiner*—Michael Miggins
(74) *Attorney, Agent, or Firm*—Knobbe Martens Olson & Bear LLP

(57) ABSTRACT

This invention relates to articles made of polyester, preferably polyethylene terephthalate (PET), having coated directly to at least one of the surfaces thereof one or more layers of thermoplastic material with good gas-barrier characteristics, and novel methods of making such articles. Preferably the barrier-coated articles take the form of preforms coated by at least one layer of barrier material and the containers blow-molded therefrom. Such barrier-coated containers are preferably of the type to hold beverages such as soft drinks, beer or juice. The preferred barrier materials have a lower permeability to oxygen and carbon dioxide than PET as well as key physical properties similar to PET. The materials and methods provide that the barrier layers have good adherence to PET, even during and after the blow molding process to form containers from preforms. Preferred barrier coating materials include poly(hydroxyamino ethers). In one preferred method, preforms are injection molded then barrier-coated immediately thereafter.

39 Claims, 14 Drawing Sheets

U.S. PATENT DOCUMENTS

| | | |
|---|---|---|
| 3,305,528 A | 2/1967 | Wynstra et al. |
| 3,317,471 A | 5/1967 | Johnson et al. |
| 3,395,118 A | 7/1968 | Reinking et al. |
| 3,482,284 A | 12/1969 | Rees |
| 3,632,267 A | 1/1972 | Kader |
| 3,719,735 A | 3/1973 | Valyi |
| 3,740,181 A | 6/1973 | Uhlig |
| 3,813,198 A | 5/1974 | Valyi |
| 3,819,314 A | 6/1974 | Marcus |
| 3,857,660 A | 12/1974 | Flynn et al. |
| 3,869,056 A | 3/1975 | Valyi |
| 3,878,282 A | 4/1975 | Bonis |
| 3,882,213 A | 5/1975 | Uhlig |
| 3,944,643 A | 3/1976 | Sato et al. |
| 3,947,176 A | 3/1976 | Rainville |
| 3,963,399 A | 6/1976 | Zavasnik |
| 3,966,378 A | 6/1976 | Valyi |
| 4,040,233 A | 8/1977 | Valyi |
| 4,061,705 A | 12/1977 | Marcus |
| 4,065,246 A | 12/1977 | Marcus |
| 4,079,851 A | 3/1978 | Valyi |
| 4,092,391 A | 5/1978 | Valyi |
| 4,116,606 A | 9/1978 | Valyi |
| 4,145,392 A | 3/1979 | Valyi |
| 4,149,645 A | 4/1979 | Valyi |
| 4,151,247 A | 4/1979 | Hafele |
| 4,151,248 A | 4/1979 | Valyi |
| 4,213,751 A | 7/1980 | Fernandez |
| 4,323,341 A | 4/1982 | Valyi |
| 4,357,296 A | 11/1982 | Hafele |
| 4,375,947 A | 3/1983 | Marcus |
| 4,376,090 A | 3/1983 | Marcus |
| 4,378,963 A | 4/1983 | Schouenberg |
| 4,395,222 A | 7/1983 | Gaiser et al. |
| 4,403,090 A | 9/1983 | Smith |
| 4,438,254 A | 3/1984 | Doorakian et al. |
| 4,480,082 A | 10/1984 | McLean et al. |
| 4,515,836 A | 5/1985 | Cobbs et al. |
| 4,538,542 A | 9/1985 | Kennon et al. |
| 4,540,543 A | 9/1985 | Thomas et al. |
| 4,560,741 A | 12/1985 | Davis et al. |
| 4,564,541 A | 1/1986 | Taira et al. |
| 4,569,869 A | 2/1986 | Kushida et al. |
| 4,573,596 A | 3/1986 | Slat |
| 4,578,295 A | 3/1986 | Jabarin |
| 4,587,073 A | 5/1986 | Jakobsen |
| 4,604,044 A | 8/1986 | Hafele |
| 4,604,258 A | 8/1986 | Valyi |
| 4,615,667 A | 10/1986 | Roy |
| 4,615,925 A | 10/1986 | Nilsson |
| 4,646,925 A | 3/1987 | Nohara |
| 4,647,648 A | 3/1987 | Silvis et al. |
| 4,699,809 A | 10/1987 | Maruhashi et al. |
| 4,715,504 A | 12/1987 | Chang et al. |
| 4,741,936 A | 5/1988 | Nohara et al. |
| 4,755,404 A | 7/1988 | Collette |
| 4,818,213 A | 4/1989 | Roy |
| 4,818,575 A | 4/1989 | Hirata et al. |
| 4,830,811 A | 5/1989 | Aoki |
| 4,847,129 A | 7/1989 | Collette et al. |
| 4,867,664 A | 9/1989 | Fukuhara |
| 4,871,410 A | 10/1989 | Bonnebat et al. |
| 4,937,130 A | 6/1990 | Clagett et al. |
| 4,940,616 A | 7/1990 | Yatsu et al. |
| 4,956,143 A | 9/1990 | McFarlane |
| 4,980,211 A | 12/1990 | Kushida |
| 5,006,381 A | 4/1991 | Nugent, Jr. et al. |
| 5,077,111 A | 12/1991 | Collette |
| 5,085,821 A | 2/1992 | Nohara |
| 5,089,588 A | 2/1992 | White et al. |
| 5,094,793 A | 3/1992 | Schrenk et al. |
| 5,115,075 A | 5/1992 | Brennan et al. |
| 5,134,218 A | 7/1992 | Brennan et al. |
| 5,143,998 A | 9/1992 | Brennan et al. |
| 5,149,768 A | 9/1992 | White et al. |
| 5,164,472 A * | 11/1992 | White et al. .................. 528/97 |
| 5,188,787 A | 2/1993 | King et al. |
| 5,202,074 A | 4/1993 | Schrenk et al. |
| 5,246,751 A | 9/1993 | White et al. |
| 5,275,853 A | 1/1994 | Silvis et al. |
| RE34,537 E | 2/1994 | Dyrup |
| 5,300,326 A | 4/1994 | Zezinka et al. |
| 5,300,541 A | 4/1994 | Nugent, Jr. et al. |
| 5,302,417 A | 4/1994 | Yamauchi et al. |
| 5,354,532 A | 10/1994 | Nakai et al. |
| 5,443,378 A | 8/1995 | Jaroschek et al. |
| 5,443,766 A | 8/1995 | Slat et al. |
| 5,464,106 A * | 11/1995 | Slat et al. .................. 215/12.1 |
| 5,472,753 A | 12/1995 | Farha |
| 5,489,455 A | 2/1996 | Nugent, Jr. et al. |
| 5,491,204 A | 2/1996 | Nugent, Jr. et al. |
| 5,508,076 A | 4/1996 | Bright |
| 5,509,965 A | 4/1996 | Harry et al. |
| 5,540,878 A | 7/1996 | Schrenk et al. |
| 5,551,858 A | 9/1996 | Yoshizawa et al. |
| 5,571,470 A | 11/1996 | Plester |
| 5,582,788 A | 12/1996 | Collette et al. |
| 5,599,494 A | 2/1997 | Marcus |
| 5,628,950 A | 5/1997 | Schrenk et al. |
| 5,628,957 A * | 5/1997 | Collette et al. ............. 264/512 |
| 5,639,848 A | 6/1997 | Nugent, Jr. et al. |
| 5,645,183 A | 7/1997 | Slat et al. |
| 5,651,933 A | 7/1997 | Slat et al. |
| 5,652,034 A | 7/1997 | Seiner |
| 5,676,267 A | 10/1997 | Slat et al. |
| 5,688,570 A | 11/1997 | Ruttinger |
| 5,688,572 A | 11/1997 | Slat et al. |
| 5,728,439 A | 3/1998 | Carlblom |
| 5,731,094 A | 3/1998 | Brennan et al. |
| 5,759,653 A | 6/1998 | Collette et al. |
| 5,759,654 A | 6/1998 | Cahill |
| 5,759,656 A | 6/1998 | Collette et al. |
| 5,772,056 A | 6/1998 | Slat |
| 5,780,128 A | 7/1998 | Farha |
| 5,804,305 A | 9/1998 | Slat et al. |
| 5,834,078 A | 11/1998 | Cavitt et al. |
| 5,837,339 A | 11/1998 | Wood et al. |
| 5,851,471 A * | 12/1998 | Schloss et al. ............. 264/250 |
| 5,876,812 A * | 3/1999 | Frisk et al. ................ 428/35.7 |
| 5,894,023 A | 4/1999 | Schramm et al. |
| 5,906,285 A | 5/1999 | Slat |
| 5,906,787 A | 5/1999 | Plester |
| 5,914,138 A | 6/1999 | Swenson |
| 5,927,525 A | 7/1999 | Darr et al. |
| 5,968,620 A | 10/1999 | Harvey et al. |
| 5,972,445 A | 10/1999 | Kimura et al. |
| 5,989,661 A | 11/1999 | Krishnakumar et al. |
| 6,051,294 A | 4/2000 | White et al. |
| 6,068,900 A | 5/2000 | Kohn et al. |
| 6,090,460 A | 7/2000 | Collette et al. |
| 6,123,211 A | 9/2000 | Rashid et al. |
| 6,136,354 A | 10/2000 | Wood et al. |
| 6,168,740 B1 | 1/2001 | Koch et al. |
| 6,180,715 B1 | 1/2001 | Schmidt |
| 6,312,641 B1 | 11/2001 | Hutchinson |
| 6,319,574 B1 | 11/2001 | Slat |
| 6,352,426 B1 | 3/2002 | Hutchinson et al. |
| 6,365,247 B1 | 4/2002 | Cahill et al. |
| 6,372,318 B1 | 4/2002 | Collette et al. |
| 6,391,408 B1 * | 5/2002 | Hutchinson ................ 428/35.7 |
| 6,428,737 B1 | 8/2002 | Collette et al. |
| 6,461,697 B1 | 10/2002 | Slat et al. |
| 6,524,672 B1 | 2/2003 | Slat et al. |
| 6,676,883 B2 * | 1/2004 | Hutchinson et al. ........ 264/510 |

|   |   |   |   |
|---|---|---|---|
| 6,808,820 B2 * | 10/2004 | Lee et al. ............... 428/480 | |
| 2001/0030163 A1 | 10/2001 | Rashid et al. | |
| 2002/0001686 A1 | 1/2002 | Kashiba et al. | |
| 2002/0028870 A1 | 3/2002 | Lan et al. | |
| 2002/0048682 A1 | 4/2002 | Subramanian et al. | |
| 2002/0061371 A1 | 5/2002 | Schmidt et al. | |
| 2002/0090473 A1 | 7/2002 | Lee et al. | |
| 2002/0155236 A1 | 10/2002 | Cahill et al. | |
| 2003/0012904 A1 | 1/2003 | Hutchinson et al. | |
| 2003/0039779 A1 | 2/2003 | Share et al. | |
| 2004/0013833 A1 | 1/2004 | Hutchinson et al. | |
| 2004/0071885 A1 | 4/2004 | Hutchinson | |
| 2004/0247735 A1 | 12/2004 | Hutchinson et al. | |
| 2005/0053739 A1 * | 3/2005 | Lee et al. ............... 428/35.7 | |

FOREIGN PATENT DOCUMENTS

| | | |
|---|---|---|
| DE | 26 49 640 | 5/1978 |
| DE | 30 44 930 A1 | 10/1981 |
| DE | 3407 060 C2 | 4/1986 |
| DE | 3518 441 C2 | 3/1987 |
| DE | 3518 875 C2 | 9/1989 |
| DE | 3121 420 C2 | 3/1990 |
| DE | 3121 421 C2 | 8/1990 |
| DE | 298 620 A5 | 3/1992 |
| DE | 196 40 662 C1 | 3/1998 |
| EP | 0 019 438 A1 | 11/1980 |
| EP | 0 100 375 A2 | 9/1982 |
| EP | 0 212 339 B1 | 4/1983 |
| EP | 0 095 909 B1 | 5/1983 |
| EP | 0 099 727 A2 | 7/1983 |
| EP | 0 105 826 B1 | 7/1983 |
| EP | 0 092 979 B1 | 11/1983 |
| EP | 0 096 581 B1 | 12/1983 |
| EP | 0 100 375 A | 2/1984 |
| EP | 0 126 575 A2 | 5/1984 |
| EP | 0 118 226 B2 | 9/1984 |
| EP | 0 125 107 A1 | 11/1984 |
| EP | 0 156 085 B1 | 11/1984 |
| EP | 0 174 265 A2 | 3/1985 |
| EP | 0 171 161 B1 | 6/1985 |
| EP | 0 153 120 B1 | 8/1985 |
| EP | 0 153 894 B1 | 9/1985 |
| EP | 0 160 984 B1 | 11/1985 |
| EP | 0 176 229 B1 | 4/1986 |
| EP | 0 180 191 B1 | 5/1986 |
| EP | 0 191 701 A2 | 8/1986 |
| EP | 0 199 633 B1 | 10/1986 |
| EP | 0 203 630 A2 | 12/1986 |
| EP | 0 215 630 B1 | 3/1987 |
| EP | 0 218 245 B1 | 4/1987 |
| EP | 0 225 049 A2 | 6/1987 |
| EP | 0 266 900 A2 | 5/1988 |
| EP | 0 278 403 B1 | 8/1988 |
| EP | 0 280 736 A1 | 9/1988 |
| EP | 0 287 839 A2 | 10/1988 |
| EP | 0 325 030 A2 | 11/1988 |
| EP | 0 302 117 A1 | 2/1989 |
| EP | 0 306 675 B1 | 3/1989 |
| EP | 0 341 044 B1 | 3/1989 |
| EP | 0 350 745 A2 | 1/1990 |
| EP | 0 351 118 A2 | 1/1990 |
| EP | 0 395 237 A1 | 4/1990 |
| EP | 0 368 278 A2 | 5/1990 |
| EP | 0 376 469 B1 | 7/1990 |
| EP | 0 462 455 A1 | 6/1991 |
| EP | 0 524 572 B1 | 7/1992 |
| EP | 0 544 545 A1 | 11/1992 |
| EP | 0 518 703 A2 | 12/1992 |
| EP | 0 518 703 A3 | 12/1992 |
| EP | 0 571 116 A1 | 10/1993 |
| EP | 0 583 953 A1 | 12/1993 |
| EP | 0 581 970 A1 | 2/1994 |
| EP | 0 387 614 B1 | 6/1994 |
| EP | 0 671 251 A1 | 9/1995 |
| EP | 0 678 554 A1 | 10/1995 |
| EP | 0 689 933 A2 | 1/1996 |
| EP | 0 767 049 A2 | 10/1996 |
| EP | 0 774 491 A2 | 11/1996 |
| EP | 0 756 931 A | 2/1997 |
| EP | 0 756 931 A2 | 2/1997 |
| EP | 0 653 982 B1 | 9/1997 |
| EP | 0 794 007 A1 | 9/1997 |
| EP | 0 822 213 A | 2/1998 |
| EP | 0 822 213 A1 | 2/1998 |
| EP | 0 894 604 A1 | 2/1999 |
| EP | 0 964 031 A2 | 12/1999 |
| EP | 0 837 763 B1 | 12/2001 |
| FR | 2538297 | 6/1984 |
| GB | 1482956 | 8/1977 |
| GB | 2011309 A | 7/1979 |
| JP | 55-37335 | 3/1980 |
| JP | 57093126 | 6/1982 |
| JP | 57-93126 | 10/1982 |
| JP | 61002519 | 1/1986 |
| JP | 61185417 | 8/1986 |
| JP | 04197634 | 7/1992 |
| JP | 5200793 | 8/1993 |
| JP | 08281892 | 10/1996 |
| JP | 9296056 | 11/1997 |
| JP | 11-90975 | 4/1999 |
| WO | WO 87/02680 | 10/1986 |
| WO | WO 87/05276 | 9/1987 |
| WO | WO 89/08556 | 9/1989 |
| WO | WO 90/07553 | 7/1990 |
| WO | WO 93/01988 | 7/1991 |
| WO | WO 92/01558 | 2/1992 |
| WO | WO 93/07068 | 4/1993 |
| WO | WO 93/25835 | 12/1993 |
| WO | WO 94/01268 | 1/1994 |
| WO | WO 95/06680 | 8/1994 |
| WO | WO 94/19186 | 9/1994 |
| WO | WO 94/25366 | 11/1994 |
| WO | WO 95/00325 | 1/1995 |
| WO | WO 95/07219 | 3/1995 |
| WO | 7156349 | 6/1995 |
| WO | WO 95/18002 | 6/1995 |
| WO | WO 95/22451 | 8/1995 |
| WO | WO 95/29805 | 11/1995 |
| WO | WO 95/34425 | 12/1995 |
| WO | WO 96/18685 | 12/1995 |
| WO | WO 97/28218 | 2/1996 |
| WO | WO 96/35571 | 3/1996 |
| WO | WO 96/33062 | 4/1996 |
| WO | WO 96/20074 | 7/1996 |
| WO | WO 97/09366 | 8/1996 |
| WO | WO 97/02939 | 1/1997 |
| WO | WO 97/09366 A1 | 3/1997 |
| WO | WO 97/26127 | 7/1997 |
| WO | WO 97/28218 A1 | 8/1997 |
| WO | WO 97/32708 | 9/1997 |
| WO | WO 97/34758 | 9/1997 |
| WO | WO 97/40972 | 11/1997 |
| WO | WO 97/40981 | 11/1997 |
| WO | WO 97/42250 A | 11/1997 |
| WO | WO 97/42250 A1 | 11/1997 |
| WO | WO 97/43182 | 11/1997 |
| WO | WO 97/44174 | 11/1997 |
| WO | WO 97/47695 | 12/1997 |
| WO | WO 98 02479 | 1/1998 |
| WO | WO 98/02479 A1 | 1/1998 |
| WO | WO 98 17470 A | 4/1998 |
| WO | WO 98/17470 A1 | 4/1998 |
| WO | WO 98/46410 | 10/1998 |
| WO | WO 99/20462 | 4/1999 |
| WO | WO 99/20462 A2 | 4/1999 |

| | | |
|---|---|---|
| WO | WO 99/20462 A3 | 4/1999 |
| WO | WO 99/43563 | 9/1999 |
| WO | WO 99/61514 A1 | 12/1999 |
| WO | WO 00/62998 A2 | 10/2000 |
| WO | WO 01/83193 A1 | 11/2001 |
| WO | WO 02/20246 A1 | 3/2002 |

OTHER PUBLICATIONS

White et al.; "High-Barrier Structural Thermoplastics Based on Diglycidyl Ethers", Polymer Science; vol. 34(1); 1993; pp. 904-905.

"Mitsui B-010:Gas Barrier Polyester"; Chemical Data Sheet; Mitsui Chemicals, Inc.; Feb. 1, 1998.

Patent Abstracts of Japan vol. 006, No. 184 (M-157), Sep. 21, 1982 & JP 57 093126 A (Sumitomo Heavy Ind Ltd), Jun. 10, 1982 abstract.

Patent Abstracts of Japan vol. 1997, No. 02 Feb. 28, 1997 & JP 08 281892 A (Mitsubishi Plastics Ind Ltd), Oct. 29, 1996 abstract.

Database WPI Section Ch, Week 199533 Derwent Publications Ltd., London, GB, AN 1995-251427 XP002150645 & JP 07 156349 A (Kureha Chem Ind Co Ltd), Jun. 20, 1995 abstract.

Patent Abstracts of Japan vol. 016, No. 529 (M-1332), Oct. 29, 1992 & JP 04197634 A (Kao Corp), Jul. 17, 1992 abstract.

Database WPI Section Ch, Week 199805 Derwent Publications Ltd., London, GB, AN 1998-047013 XP002150646 & JP 09 0296056 A (Nipon Ester Co Ltd), Nov. 18, 1997 abstract.

The Condensed Chemical Dictionary, 1981, p. 65.

Yukihiko Suematsu; Growth Prospects & Challenges for Pet in Asia/Japan: A Producer's Perspective.

European Search Report issued in Application No. 05077555.0-2307 on Apr. 28, 2006.

* cited by examiner

COATED POLYESTER PREFORMS AND ARTICLES

RELATED APPLICATION DATA

This application is a divisional of U.S. patent application Ser. No. 10/152,318, filed May 20, 2002, now U.S. Pat. No. 6,676,883, which is a divisional of U.S. Patent Application Ser. No. 09/174,971 filed Oct. 19, 1998, now U.S Pat. No. 6,391,408, which is a continuation-in part of U.S. patent application Ser. No. 08/953,595 tiled Oct. 17, 1997, now U.S. Pat. No. 6,312,641, and also claims priority under 35 U.S.C. 119(e) from provisional application Ser. No. 60/078, 641 filed Mar. 19, 1998, now expired.

BACKGROUND OF THE INVENTION

This invention relates to barrier-coated polyesters, preferably barrier coated polyethylene terephthalate (PET) and articles made therefrom. Preferably the barrier-coated PET takes the form of preforms having at least one layer of a barrier material and the bottles blow-molded therefrom. This invention further relates to methods of making articles formed of barrier coated polyester.

The use of plastic containers as a replacement for glass or metal containers in the packaging of beverages has become increasingly popular. The advantages of plastic packaging include lighter weight, decreased breakage as compared to glass, and potentially lower costs. The most common plastic used in making beverage containers today is PET. Virgin PET has been approved by the FDA for use in contact with foodstuffs. Containers made of PET are transparent, thin-walled, lightweight, and have the ability to maintain their shape by withstanding the force exerted on the walls of the container by pressurized contents, such as carbonated beverages. PET resins are also fairly inexpensive and easy to process.

Despite these advantages and its widespread use, there is a serious downside to the use of PET in thin-walled beverage containers: permeability to gases such as carbon dioxide and oxygen. These problems are of particular importance when the bottle is small. In a small bottle, the ratio of surface area to volume is large which allows for a large surface for the gas contained within to diffuse through the walls of the bottle. The permeability of PET bottles results in soft drinks that go "flat" due to the egress of carbon dioxide, as well as beverages that have their flavor spoiled due to the ingress of oxygen. Because of these problems, PET bottles are not suitable for all uses desired by industry, and for many of the existing uses, the shelf-life of liquids packaged in PET bottles is shorter than desired.

Although the plastic beverage container industry is large and competitive and the permeability problem with PET containers has been known since the inception of their use, there still is no good working solution to the permeability problem. Attempts to produce containers with barrier coatings have been heretofore largely unsuccessful.

Most of the problem with producing coated containers comes from the difficulty in finding suitable barrier materials. When most materials are placed on PET they will not adhere at all or they will adhere so weakly that they will delaminate from the PET over a short period of time or under minimal stress. Examples of such materials are polyvinyl chloride (PVC) and polyvinylidene chloride (PVDC). Materials that do adhere to PET often do not have good barrier properties or have other characteristics that do not make them suitable for use in a low-cost commercial barrier coated container.

U.S. Pat. No. 5,464,106 to Slat, et al, describes bottles formed from the blow molding of preforms having a barrier layer. The barrier materials disclosed are polyethylene naphthalate, saran, ethylene vinyl alcohol copolymers or acrylonitrile copolymers. In Slat's technique, the barrier material and the material to form the inner wall of the preform are coextruded in the shape of a tube. This tube is then cut into lengths corresponding to the length of the preform, and is then placed inside a mold wherein the outer layer of the preform is injected over the tube to form the finished preform. The preform may then be blow-molded to form a bottle. The drawbacks of this method are that most of the barrier materials disclosed do not adhere well to PET, and that the process itself is rather cumbersome.

A family of materials with good barrier characteristics are those disclosed in U.S. Pat. No. 4,578,295 to Jabarin. Such barrier materials include copolymers of terephthalic acid and isophthalic acid with ethylene glycol and at least one diol. This type of material is commercially available as B-010 from Mitsui Petrochemical Ind. Ltd. (Japan). These barrier materials are miscible with polyethylene terephthalate and form blends of 80-90% PET and 10-20% of the copolyester from which barrier containers are formed. The containers made from these blends are about 20-40% better gas barriers to $CO_2$ transmission than PET alone. Although some have claimed that this polyester adheres to PET without delamination, the only preforms or containers disclosed were made with blends of these materials. There is no evidence that anyone heretofore has actually made a laminar preform or container using these materials from which to base such a statement.

Another group of materials, the polyamine-polyepoxides, have been proposed for use as a gas-barrier coating. These materials can be used to form a barrier coating on polypropylene or surface-treated PET, as described in U.S. Pat. No. 5,489,455 to Nugent, Jr. et al. These materials commonly come as a solvent or aqueous based thermosetting composition and are generally spray coated onto a container and then heat-cured to form the finished barrier coating. Being thermosets, these materials are not conducive to use as preform coatings, because once the coating has been cured, it can no longer be softened by heating and thus cannot be blow molded, as opposed to thermoplastic materials which can be softened at any time after application.

Another type of barrier-coating, that disclosed in U.S. Pat. No. 5,472,753 to Farha, relies upon the use of a copolyester to effect adherence between PET and the barrier material. Farha describes two types of laminates, a three-ply and a two-ply. In the three-ply laminate, an amorphous, thermoplastic copolyester is placed between the barrier layer of phenoxy-type thermoplastic and the layer of PET to serve as a tie layer to bind the inner and outer layers. In the two-ply laminate, the phenoxy-type thermoplastic is first blended with the amorphous, thermoplastic copolyester and this blend is then applied to the PET to form a barrier. These laminates are made either by extrusion or by injection molding wherein each layer is allowed to cool before the other layer of material is injected.

Thus, the need for barrier-coated PET preforms and containers which are economical, cosmetically appealing, easy to produce, and have good barrier and physical properties remains unfulfilled.

SUMMARY OF THE INVENTION

This invention relates to articles made of PET having coated upon the surfaces thereof one or more thin layers of thermoplastic material with good gas-barrier characteristics. The articles of the present invention are preferably in the form of preforms and containers. In preferred embodiments, the polyester comprises polyethylene terephthalate and the Phenoxy-type thermoplastic comprises a poly(hydroxyamino ether).

In one aspect, the present invention provides for a barrier-coated polyester article comprising at least one layer of amorphous polyester directly adhered to at least one layer of barrier material. The barrier material, which comprises a copolyester of terephthalic acid, isophthalic acid and at least one diol, has a glass transition temperature between 55 C. and 140 C., and has a permeability to oxygen and carbon dioxide which is less than that, of polyethylene terephthalate.

In another aspect of the present invention there is provided a process for making a barrier-coated container comprising the steps of providing a barrier-coated polyester article in the form of a preform, such as that described above, and blow-molding the preform to the desired container shape.

In yet another aspect of the present invention there is provided a barrier coated preform comprising a polyester layer and a barrier layer comprising barrier material, wherein the polyester layer is thinner in the end cap than in the wall portion and the barrier layer is thicker in the end cap than in the wall portion.

In another aspect of the present invention, a multi-layer article comprising a wall portion comprising an inner multi-component layer and an outer layer. The inner multi-component layer has at least two discrete sublayers having an interface surface between the sublayers and extends longitudinally of the article, one of the sublayers comprising polyester and another of the sublayers comprising a barrier material comprising a (i) a Phenoxy-type Thermoplastic or (ii) a copolyester of terephthalic acid, isophthalic acid, and at least one diol, the barrier material having a permeability to carbon dioxide of no more than one-third of the permeability to carbon dioxide of polyethylene terephthalate. The outer layer comprises recycled polyester and the inner multi-component layer and the outer layer comprises materials with an absolute refractive index of 1.55-1.75.

In yet another aspect of the present invention there is provided a multi-layer preform comprising a wall portion having an inner layer and an outer layer. The inner layer comprises polyester, extends longitudinally of the preform terminating in a threaded neck finish section having externally upset threads to receive a closure member, has a support ring at the lower end of the threaded neck finish section, and has a thickness of at least two millimeters and an absolute refractive index of 1.55-1.65. The outer layer co-extends with the inner layer to terminate below the support ring and comprises (i) a copolyester of terephthalic acid, isophthalic acid, and at least one diol or (ii) a Phenoxy-type Thermoplastic selected from the group consisting of poly(hydroxy ether), poly(hydroxy ester ether), and poly (hydroxyamino ether), wherein the outer layer has a permeability to oxygen less than that of the inner layer and a thickness of no more than one-fourth the thickness of the inner layer. Additionally, the outer layer has an absolute refractive index of a value to provide a ratio of the refractive indices within the range of 1.0-1.2.

In a further aspect of the present invention there is provided a process for making a barrier coated polyester article comprising the steps of providing polyester article having at least one surface at a temperature of at least 100 C., and placing a barrier material on the heated surface of the polyester. The barrier material, comprising a Phenoxy-type Thermoplastic or a copolyester of terephthalic acid, isophthalic acid and at least one diol, has a glass transition temperature between about 55 C. and 140 C., and has a permeability to oxygen and carbon dioxide which is less than that of polyethylene terephthalate. In preferred embodiments, the coating process is done by dip coating, spray coating, flame spraying, electrostatic spraying, dipping the polyester article to be coated in a fluidized bed of barrier resin, or overmolding the polyester article with a melt of barrier material.

In another aspect of the present invention there is provided a method for making a barrier coated polyester article. A polyester article with at least an inner surface and an outer surface is formed by injecting molten polyester through a first gate into the space defined by a first mold half and a core mold half, where the first mold half and the core mold half are cooled by circulating fluid and the first mold half contacts the outer polyester surface and the core mold half contacts the inner polyester surface. Following this, the molten polyester is allowed to remain in contact with the mold halves until a skin forms on the inner and outer polyester surfaces which surrounds a core of molten polyester. The first mold half is then removed from the polyester article, and the skin on the outer polyester surface is softened by heat transfer from the core of molten polyester, while the inner polyester surface is cooled by continued contact with the core mold half. The polyester article, still on the core mold half is then placed into a second mold half, wherein the second mold half is cooled by circulating fluid. In the coating step, the barrier layer comprising barrier material is placed on the outer polyester surface by injecting molten barrier material through a second gate into the space defined by the second mold half and the outer polyester surface to form the barrier coated polyester article. The second mold half is then removed from the barrier coated article and then the barrier coated article is removed from the core mold half. The barrier materials used in the process preferably comprise a Phenoxy-type Thermoplastic or a copolyester of terephthalic acid, isophthalic acid and at least one diol.

In another aspect of the present invention, there is provided an "inject-over-LIM" process for the production of a multi-layer plastic container comprising several steps. A first polymer comprising a polyester and a second polymer comprising a copolyester of terephthalic acid, isophthalic acid and at least one diol are provided, and injected through a lamellar injection system to provide a composite multi-lamellae stream having at least one discrete lamella of polyester and at least another discrete lamella of the copolyester. The composite stream is then supplied to a mold to form an initial preform having inner and outer sublayers comprising polyester and the copolyester, wherein the sublayer comprising copolyester has a permeability to air which is less than the permeability to air of the sublayer comprising polyester. Recycled polyester is then supplied over the initial preform to form an outer layer to form a final preform. The final preform is then subjected to a blow molding operation to form a multi-layer plastic container.

In another aspect of the present invention there is provided a "LIM-over-inject" process for the production of a multi-layer plastic container. In this method, polyester is supplied to a mold to form an initial preform comprising polyester. A first body of a thermoplastic polymer comprising recycled polyester and a second body of thermoplastic barrier polymer comprising (i) a copolyester of terephthalic acid, isophthalic acid, and at least one diol or (ii) a Phenoxy-type Thermoplastic are provided and injected through a lamellar injection system having a coextrusion feed block unit to provide a composite multi-lamella stream having at least one discrete lamella of recycled polyester and at least one discrete lamella of the thermoplastic barrier polymer. The composite stream is supplied over the initial preform to form a final preform wherein the composite stream comprising sublayers of recycled polyester and the thermoplastic barrier material overlays the initial preform of polyester, and the final preform is subjected to a blow molding operation to form a multi-layer plastic container.

In a further aspect of the present invention, there is provided a method of making and coating preforms. The method begins by closing a mold comprising a stationary half and a movable half, wherein the stationary mold half comprises at least one preform molding cavity and at least one preform coating cavity and the movable mold half comprises a rotatable plate having mounted thereon a number of mandrels equal to the sum of the number of preform molding cavities and preform coating cavities. The remaining steps comprise: injecting a first material into the space defined by a mandrel and a preform molding cavity to form a preform having an inner surface and an outer surface; opening the mold; rotating the rotatable plate; closing the mold; injecting a second material into the space defined by the outer surface of the preform and the preform coating cavity to form a coated preform; opening the mold; removing the coated preform.

In further aspects of the above-described invention, the barrier materials of the present invention may further comprise Nanoparticles. The layer of barrier material in the articles of the present invention may consist of a plurality of microlayers comprising barrier material.

DETAILED DESCRIPTION OF THE PREFERRED EMBODIMENTS

A. General Description of the Invention

Figure 1:
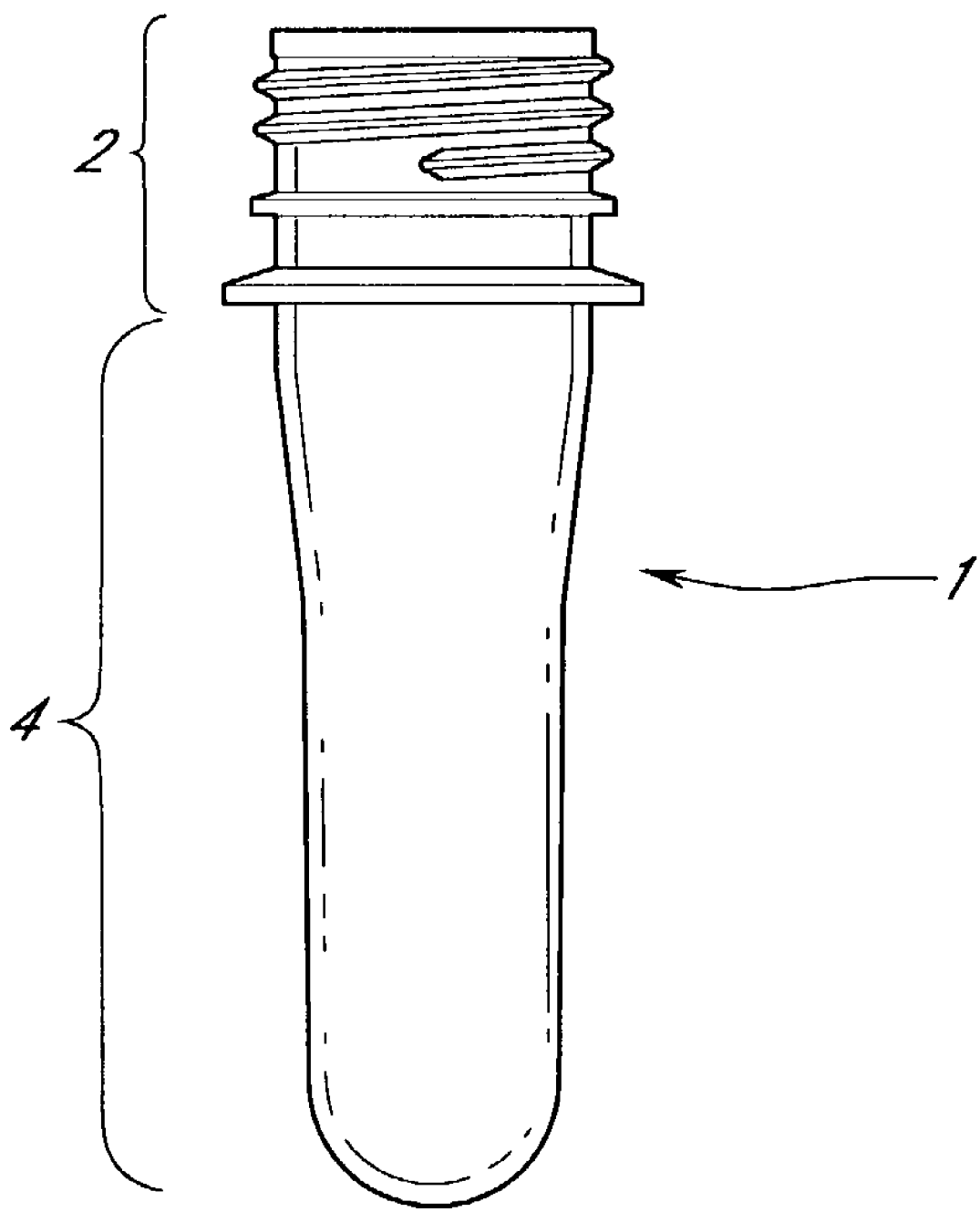
FIG. 1 is an uncoated preform as is used as a starting material for the present invention.

This invention relates to plastic articles having coatings comprising one or more layers of thermoplastic material with good gas-barrier characteristics and methods of making such articles. As presently contemplated, one embodiment of barrier coated article is a bottle of the type used for beverages. Alternatively, the barrier coated articles of the present invention could take the form of jars, tubs, trays, or bottles for holding liquid foods. However, for the sake of simplicity, the present invention will be described herein primarily in the context of beverage bottles and the preforms from which they are made by blow-molding.

Furthermore, the invention is described herein specifically in relation to polyethylene terephthalate (PET) but it is applicable to many other thermoplastics of the polyester type. Examples of such other materials include polyethylene 2,6- and 1,5-naphthalate (PEN), PETG, polytetramethylene 1,2-dioxybenzoate and copolymers of ethylene terephthalate and ethylene isophthalate, but does not include copolyesters of terephthalic acid, isophthalic acid and at least one diol, as described elsewhere herein as a barrier material.

Preferably, the preforms and containers have the barrier coating disposed on their outer surfaces or within the wall of the container. In contrast with the technique of Slat which produces multilayered preforms in which the layers are readily separated, in the present invention the thermoplastic barrier material adheres directly and strongly to the PET surface and is not easily separated therefrom. Adhesion between the layers results without the use of any additional materials such as an adhesive material or a tie layer. The coated preforms are processed, preferably by stretch blow molding to form bottles using methods and conditions similar to those used for uncoated PET preforms. The containers which result are strong, resistant to creep, and cosmetically appealing as well as having good gas-barrier properties.

As explained in greater detail below, one or more layers of a barrier material are employed in carrying out the present invention. As used herein, the terms "barrier material", "barrier resin" and the like refer to materials which, when used to form articles, have key physical properties similar to PET, adhere well to PET, and have a lower permeability to oxygen and carbon dioxide than PET.

A number of barrier materials having the requisite low permeability to gases such as oxygen and carbon dioxide are useful in the present invention, the choice of barrier material being partly dependent upon the mode or application as described below. Preferred barrier materials for use in barrier coatings in the present invention fall into two major categories: (1) copolyesters of terephthalic acid, isophthalic acid, and at least one diol, such as those disclosed in the aforementioned patent to Jabarin, and that which is commercially available as B-010 (Mitsui Petrochemical Ind. Ltd., Japan); and (2) hydroxy-functional poly(amide-ethers) such as those described in U.S. Pat. Nos. 5,089,588 and 5,143,998, poly(hydroxy amide ethers) such as those described in U.S. Pat. No. 5,134,218, polyethers such as those described in U.S. Pat. No. 5,115,075 and 5,218,075, hydroxy-functional polyethers such as those as described in U.S. Pat. No. 5,164,472, hydroxy-functional poly(ether sulfonamides) such as those described in U.S. Pat. No. 5,149,768, poly(hydroxy ester ethers) such as those described in U.S. Pat. No. 5,171,820, hydroxy-phenoxyether polymers such as those described in U.S. Pat. No. 5,814,373, and poly(hydroxyamino ethers) ("PHAE") such as those described in U.S. Pat. No. 5,275,853. The barrier materials described in (1) above are referred to herein by the term "Copolyester Barrier Materials". The compounds described in the patents in (2) above are collectively categorized and referred to herein by the term "Phenoxy-type Thermoplastic" materials. All the patents referenced in this paragraph are hereby incorporated in their entireties into this disclosure by this reference thereto.

Preferred Copolyester Barrier Materials have FDA approval. FDA approval allows for these materials to be used in containers where they are in contact with beverages and the like which are intended for human consumption. To the inventor's knowledge, none of the Phenoxy-type Thermoplastics have FDA approval as of the date of this disclosure. Thus, these materials are preferably used in multi-layered containers in locations which do not directly contact the contents, if the contents are ingestible.

In carrying out preferred methods of the present invention to form barrier coated preforms and bottles, an initial preform is prepared or obtained and then coated with at least one additional layer of material comprising barrier material, polyesters such as PET, post-consumer or recycled PET (collectively recycled PET), and/or other compatible thermoplastic materials. A coating layer may comprise a single material, a mix or blend of materials (heterogeneous or homogeneous), an interwoven matrix of two or more materials, or a plurality of microlayers (lamellae) comprised of at least two different materials. In one embodiment, the initial preform comprises a plurality of microlayers, such as may be prepared by a lamellar injection molding process. Initial preforms comprise polyester, and it is especially preferred that initial preforms comprise virgin materials which are approved by the FDA for being in contact with foodstuffs.

Thus the preforms and containers of the present invention may exist in several embodiments, such as: virgin PET coated with a layer of barrier material; virgin PET coated with a layer of material comprising alternating microlayers of barrier material and recycled PET; virgin PET coated with a barrier layer which is in turn coated with recycled PET; microlayers of virgin PET and a barrier material coated with a layer of recycled PET; or virgin PET coated with recycled PET which is then coated with barrier material. In any case, at least one layer must comprise at least one barrier material.

Various embodiments of preforms and bottles of the present invention are all advantageous in that they enable the use of an initial preform which can be made as a structurally-sound unit. Thus, in commercial operations the initial preforms can be prepared using mass manufacturing techniques, stored for periods ranging from hours to months, and then subsequently subjected to the application of one or more layers of barrier and/or recycled polyethylene terephthalate to form the final preform which can be immediately subjected to a blow molding operation or, like the initial preform, stored for long periods of time before the final blow molding operation is carried out.

In one preferred embodiment of the present invention, the preforms are molded and then immediately barrier coated using a single piece of equipment.

As described previously, preferred barrier materials for use in accordance with the present invention are Copolyester Barrier Materials and Phenoxy-type Thermoplastics. Other barrier materials having similar properties may be used in lieu of these barrier materials. For example, the barrier material may take the form of other thermoplastic polymers, such as acrylic resins including polyacrylonitrile polymers and acrylonitrile styrene copolymers. Preferred barrier materials of the present invention have oxygen and carbon dioxide permeabilities which are less than one-third those of polyethylene terephthalate. For example, the Copolyester Barrier Materials of the type disclosed in the aforementioned patent to Jabarin will exhibit a permeability to oxygen of about 11 cc mil/100 in$^2$ day and a permeability to carbon dioxide of about 2 cc mil/100 in$^2$ day. For certain PHAEs, the permeability to oxygen is less than 1 cc mil/100 in$^2$ day and the permeability to carbon dioxide is 3.9 cc mil/100 in$^2$ day. The corresponding $CO_2$ permeability of polyethylene terephthalate, whether in the recycled or virgin form, is about 12-20 cc mil/100 in$^2$ day.

The methods of the present invention provide for a coating to be placed on a preform which is later blown into a bottle. Such methods are preferable to placing coatings on the bottles themselves. Preforms are smaller in size and of a more regular shape than the containers blown therefrom, making it simpler to obtain an even and regular coating. Furthermore, bottles and containers of varying shapes and sizes can be made from preforms of similar size and shape. Thus, the same equipment and processing can be used to produce preforms to form several different kinds of containers. The blow-molding may take place soon after molding, or preforms may be made and stored for later blow-molding. If the preforms are stored prior to blow-molding, their smaller size allows them to take up less space in storage.

Even though it is preferable to form containers from coated preforms as opposed to coating containers themselves, they have generally not been used because of the difficulties involved in making containers from coated or multi-layer preforms. One step where the greatest difficulties arise is during the blow-molding process to form the container from the preform. During this process, defects such as delamination of the layers, cracking or crazing of the coating, uneven coating thickness, and discontinuous coating or voids can result. These difficulties can be overcome by using suitable barrier materials and coating the preforms in a manner that allows for good adhesion between the layers.

Thus, one key to the present invention is the choice of a suitable barrier material. When a suitable barrier material is used, the coating sticks directly to the preform without any significant delamination, and will continue to stick as the preform is blow-molded into a bottle and afterwards. Use of a suitable barrier material also helps to decrease the incidence of cosmetic and structural defects which can result from blow-molding containers as described above.

It should be noted that although most of the discussion, drawings, and examples of making coated preforms deal with two layer preforms, such discussion is not intended to limit the present invention to two layer articles. The two layer barrier containers and preforms of the present invention are suitable for many uses and are cost-effective because of the economy of materials and processing steps. However, in some circumstances and for some applications, preforms consisting of more than two layers may be desired. Use of three or more layers allows for incorporation of materials such as recycled PET, which is generally less expensive than virgin PET or the preferred barrier materials. Thus, it is contemplated as part of the present invention that all of the methods for producing the barrier-coated preforms of the present invention which are disclosed herein and all other suitable methods for making such preforms may be used, either alone or in combination to produce barrier-coated preforms and containers comprised of two or more layers.

B. Detailed Description of the Drawings

Referring to FIG. 1, a preferred uncoated preform 1 is depicted. The preform is preferably made of an FDA approved material such as virgin PET and can be of any of a wide variety of shapes and sizes. The preform shown in FIG. 1 is of the type which will form a 16 oz. carbonated beverage bottle that requires an oxygen and carbon dioxide barrier, but as will be understood by those skilled in the art, other preform configurations can be used depending upon the desired configuration, characteristics and use of the final article. Preferably, the preforms are made by injection molding as is known in the art.

Figure 2:
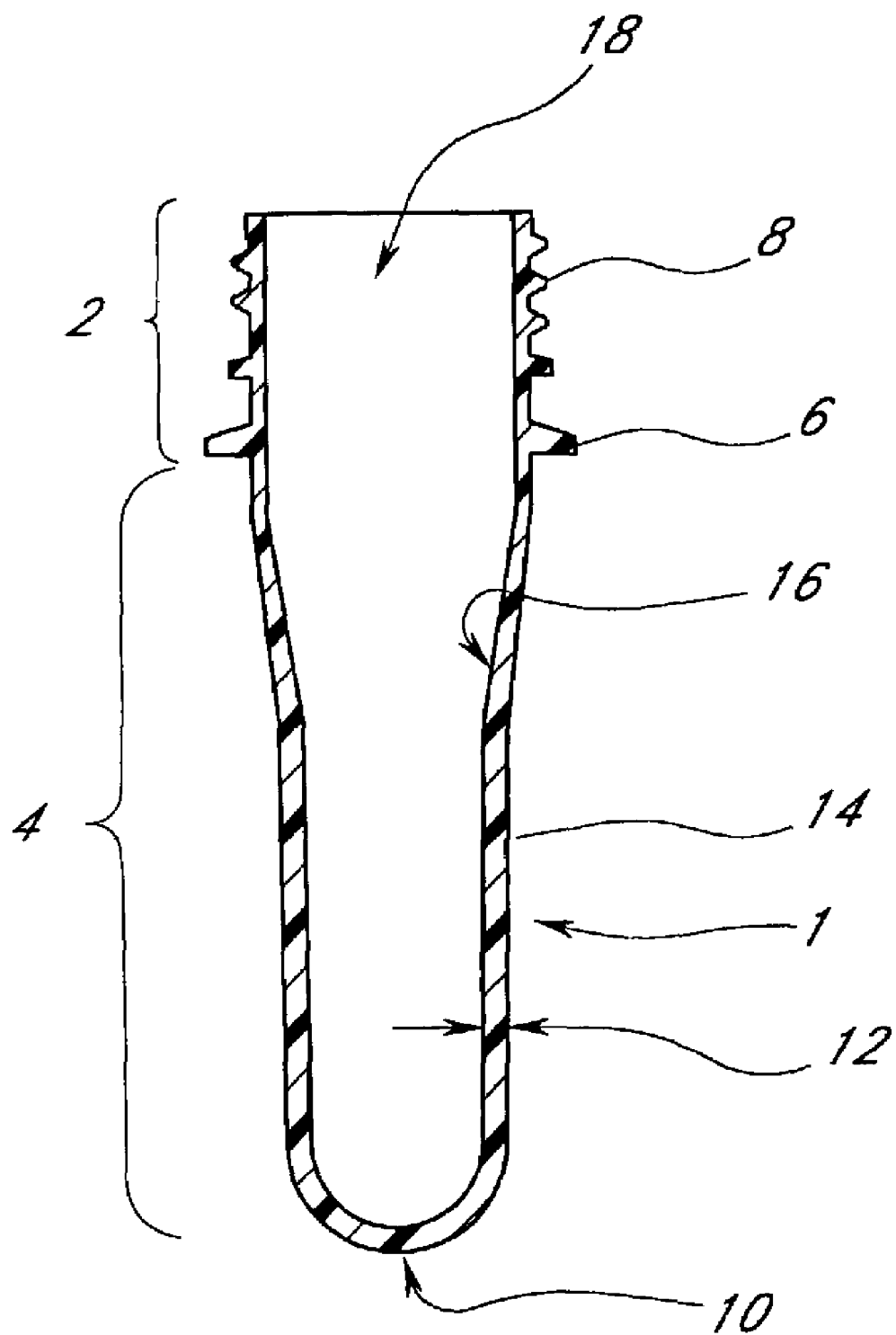
FIG. 2 is a cross-section of a preferred uncoated preform of the type that is barrier-coated in accordance with the present invention.

Referring to FIG. 2, a cross-section of the preferred uncoated preform 1 of FIG. 1 is depicted. The uncoated preform 1 has a neck portion 2 and a body portion 4. The neck portion 2 begins at the opening 18 to the interior of the preform and extends to and includes the support ring 6. The neck portion 2 is further characterized by the presence of the threads 8 which provide a means for fastening a cap for the bottle produced from the preform 1. The body portion 4 is an elongated and cylindrically shaped structure extending down from the neck portion 2 and culminating in the rounded end cap 10. The preform thickness 12 will depend upon the overall length of the preform and the wall thickness and overall size of the resulting container.

Figure 3:
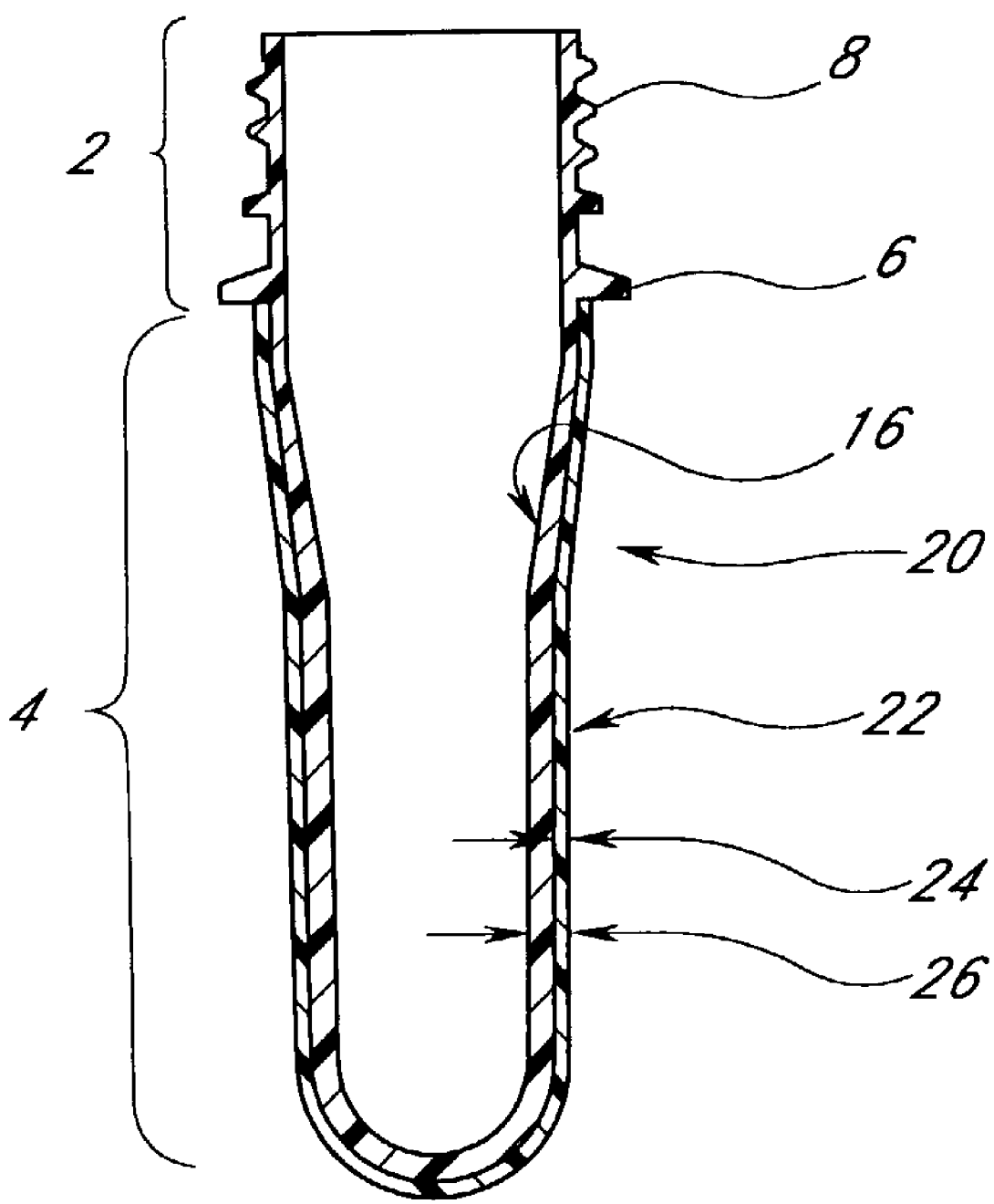
FIG. 3 is a cross-section of one preferred embodiment of barrier-coated preform of the present invention.

Referring to FIG. 3, a cross-section of one type of barrier-coated preform 20 of the present invention is disclosed. The barrier-coated preform 20 has a neck portion 2 and a body portion 4 as in the uncoated preform 1 in FIGS. 1 and 2. The barrier coating layer 22 is disposed about the entire surface of the body portion 4, terminating at the bottom of the support ring 6. The barrier coating layer 22 does not extend to the neck portion 2, nor is it present on the interior surface of the preform 16 which is preferably made of an FDA approved material such as PET. The barrier coating layer 22 may comprise either a single material or several microlayers of at least two materials, as is made using a LIM process as described below. The thickness of the overall preform 26 is equal to the thickness of the initial preform plus the thickness of the barrier layer 24, and is dependent upon the overall size and desired coating thickness of the resulting container. By way of example, the wall of the bottom portion of the preform may have a thickness of 3.2 millimeters; the wall of the neck finish, a cross-sectional dimension of about 3 millimeters; and the barrier material applied to a thickness of about 0.3 millimeters.

Figure 4:
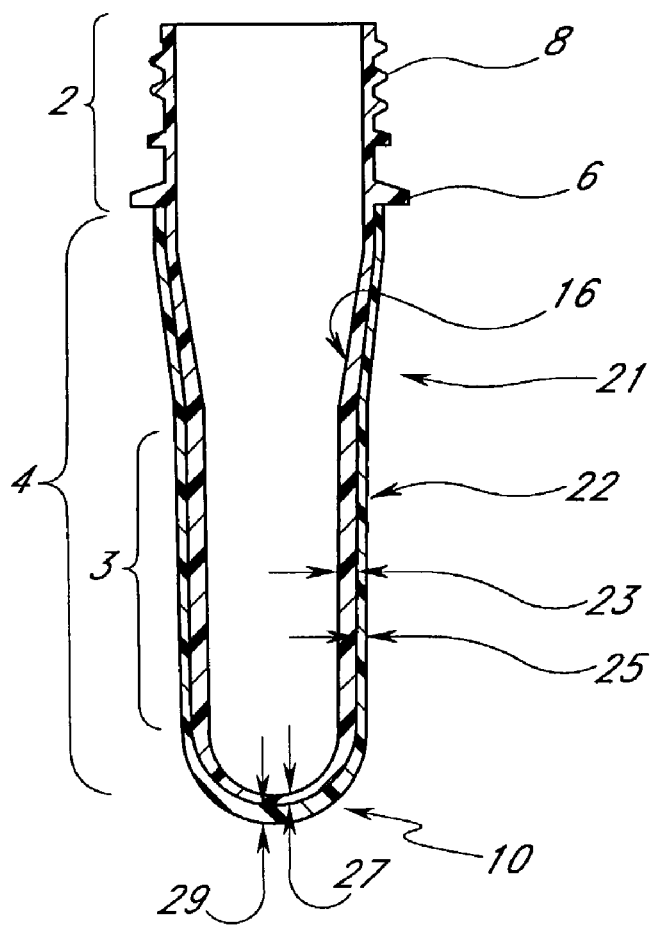
FIG. 4 is a cross-section of another preferred embodiment of a barrier-coated preform of the present invention.

Referring to FIG. 4, preferred embodiment of coated preform 21 is shown in cross-section. The primary difference between the coated preform 21 and the coated preform 20 in FIG. 3 is the relative thickness of the two layers in the area of the end cap 10. In coated preform 20 in FIG. 3 the barrier layer is generally thinner than the thickness of the initial preform throughout the entire body portion of the preform. In coated preform 21, however, the barrier coating layer 22 is thicker at 29 near the end cap 10 than it is at 25 in the wall portion 3, and conversely, the thickness of the inner polyester layer is greater at 23 in the wall portion 3 than it is at 27, in the region of the end cap 10. This preform design is especially useful when the barrier coating is applied to the initial preform in an overmolding process to make the coated preform, as described below, where it presents certain advantages including that relating to reducing molding cycle time. The barrier coating layer 22 may be homogeneous or it may be comprised of a plurality of microlayers, as is shown in FIG. 4A.

Figure 4A:
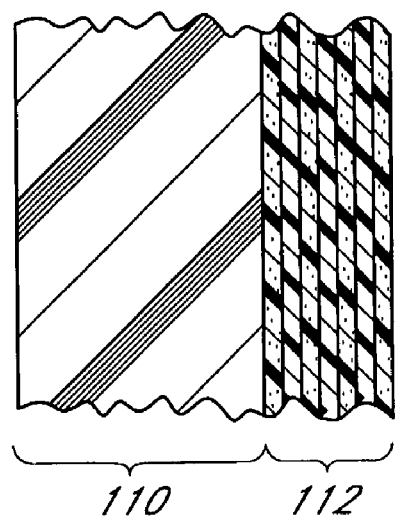
FIG. 4A is an enlargement of a section of the wall portion of a preform such as that made by a LIM-over-inject process. Not all preforms of the type in FIG. 4 made in accordance with the present invention will have this type of layer arrangement.

FIG. 4A is an enlargement of a wall section of the preform showing the makeup of the layers in a LIM over inject embodiment of preform. The layer 110 is the inner layer of the preform and 112 is the outer layer of the preform. The outer layer 112 comprises a plurality of microlayers of material as will be made when a LIM system is used. Not all preforms of FIG. 4 will be of this type.

Figure 5:
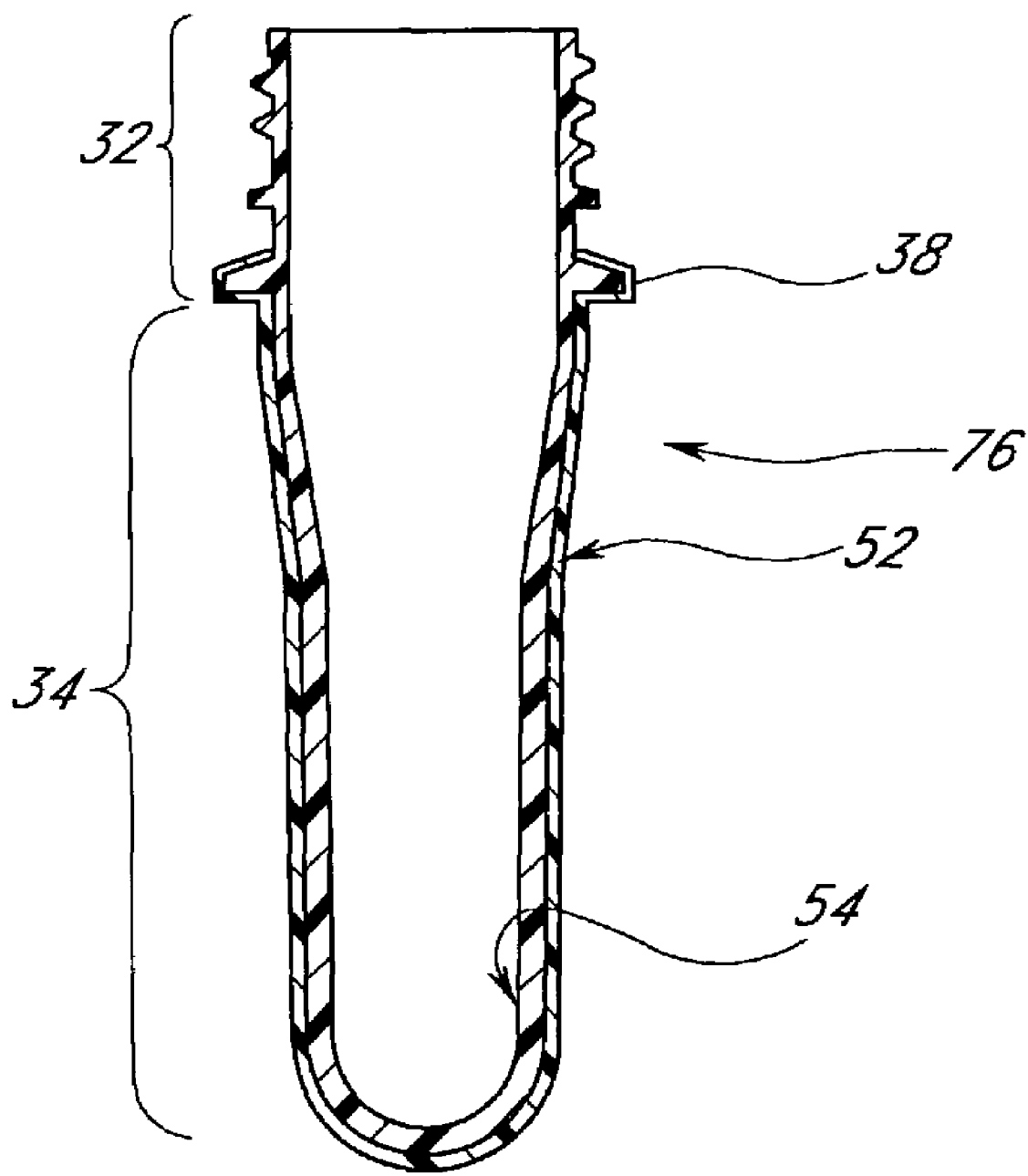
FIG. 5 is a cross-section of another embodiment of a barrier-coated preform of the present invention.

Referring to FIG. 5, another embodiment of coated preform 31 is shown in cross-section. The primary difference between the coated preform 31 and the coated preforms 20 and 21 in FIGS. 3 and 4, respectively, is that the barrier coating layer 22 is disposed on the neck portion 2 as well as the body portion 4.

The barrier preforms and containers of the present invention can have layers which have a wide variety of relative thicknesses. In view of the present disclosure, the thickness of a given layer and of the overall preform or container, whether at a given point or over the entire container, can be chosen to fit a coating process or a particular end use for the container. Furthermore, as discussed above in regard to the barrier coating layer in FIG. 3, the barrier coating layer in the preform and container embodiments disclosed herein may comprise a single material or several microlayers of two or more materials.

Figure 6:
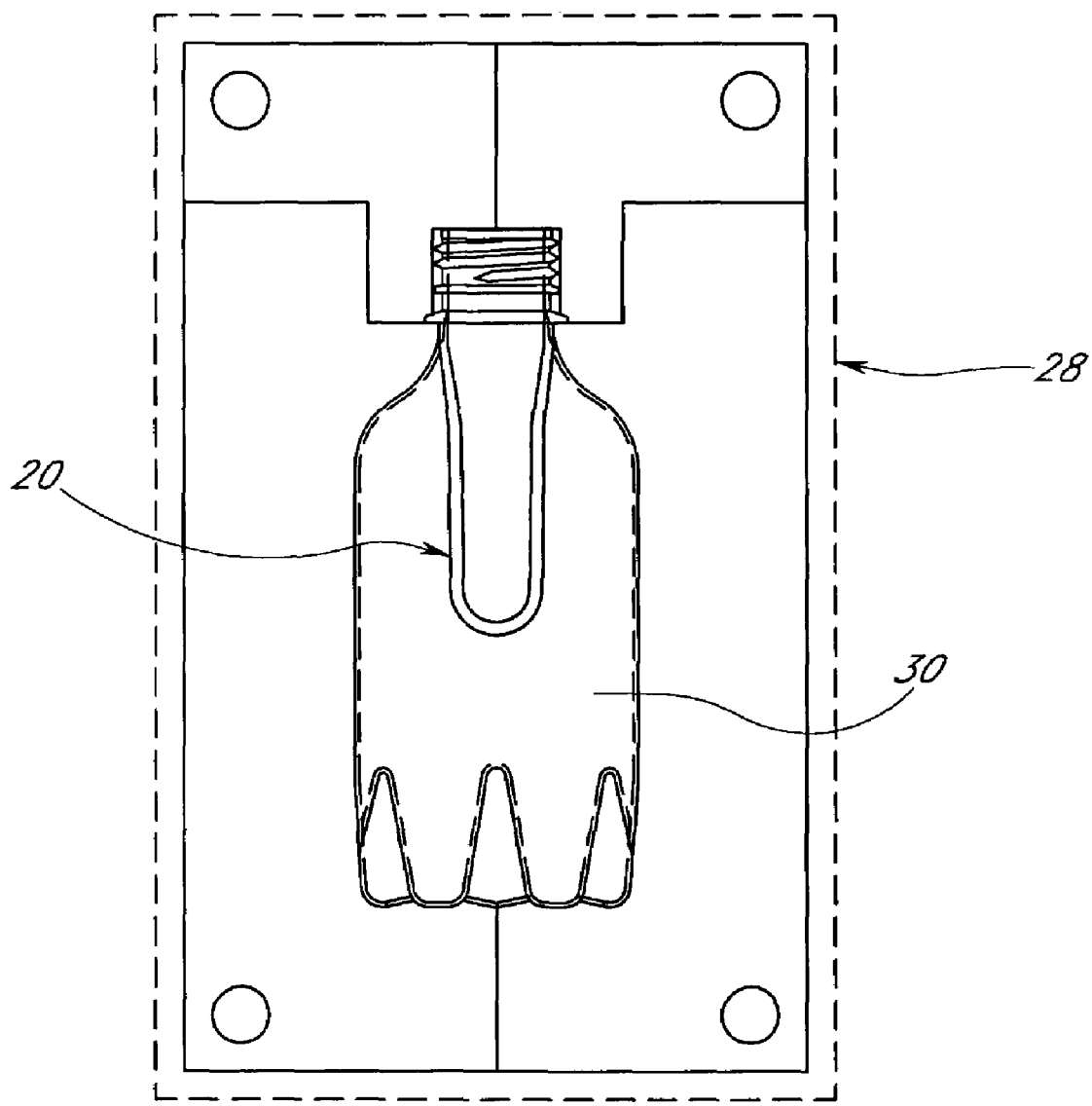
FIG. 6 is a cross-section of a preferred preform in the cavity of a blow-molding apparatus of a type that may be used to make a preferred barrier-coated container of the present invention.

After a barrier-coated preform, such as that depicted in FIG. 3, is prepared by a method such as those discussed in detail below, it is subjected to a stretch blow-molding process. Referring to FIG. 6, in this process a barrier-coated preform 20 is placed in a mold 28 having a cavity corresponding to the desired container shape. The barrier-coated preform is then heated and expanded by stretching and by air forced into the interior of the preform 20 to fill the cavity within the mold 28, creating a barrier-coated container. The blow molding operation normally is restricted to the body, portion 4 of the preform with the neck portion 2 including the threads, pilfer ring, and support ring retaining the original configuration as in the preform.

Figure 7:
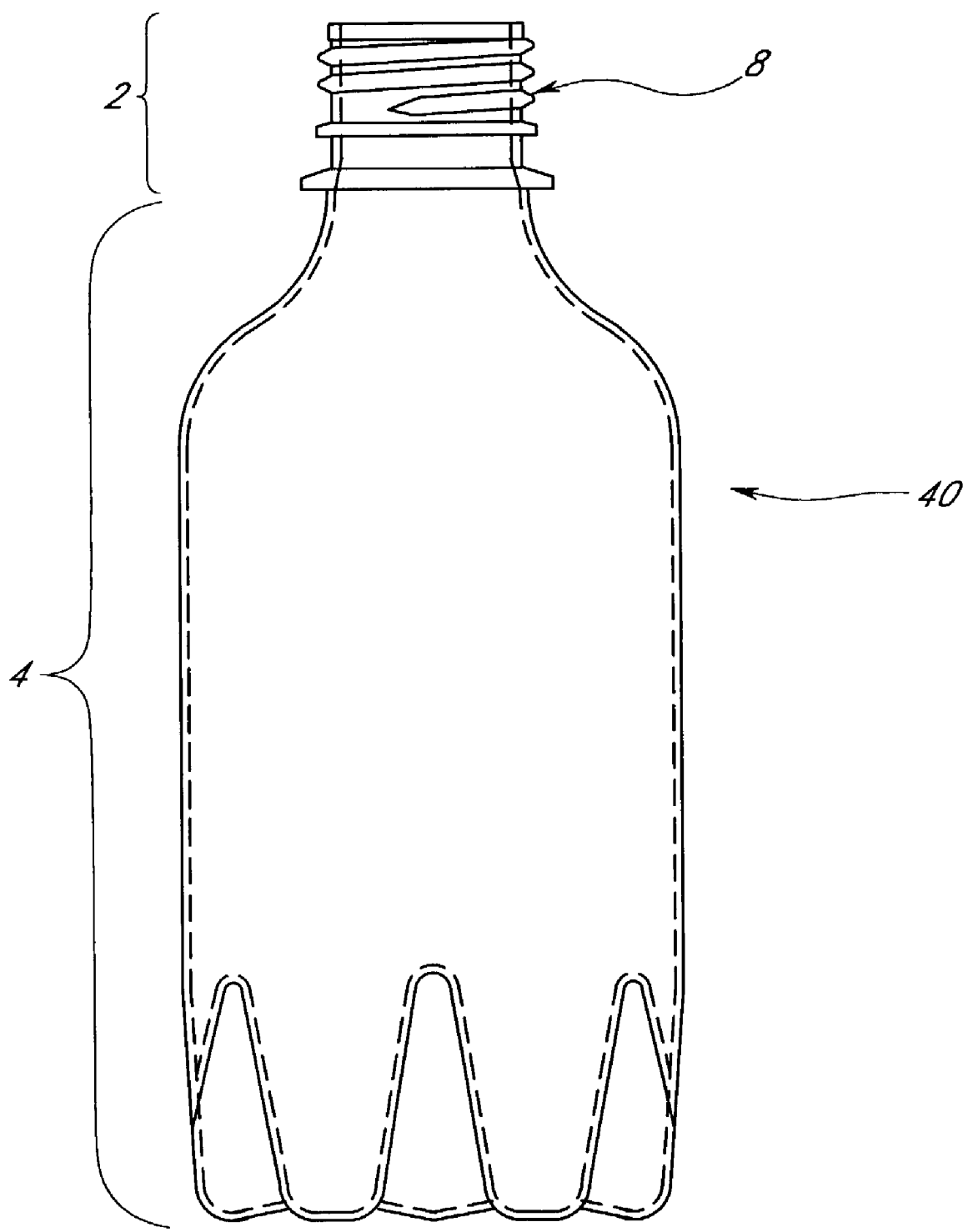
FIG. 7 is one preferred embodiment of barrier-coated container of the present invention.

Referring to FIG. 7, there is disclosed an embodiment of barrier coated container 40 in accordance with the present invention, such as that which might be made from blow molding the barrier coated preform 20 of FIG. 3. The container 40 has a neck portion 2 and a body portion 4 corresponding to the neck and body portions of the barrier-coated preform 20 of FIG. 3. The neck portion 2 is further characterized by the presence of the threads 8 which provide a means for fastening a cap onto the container.

Figure 8:
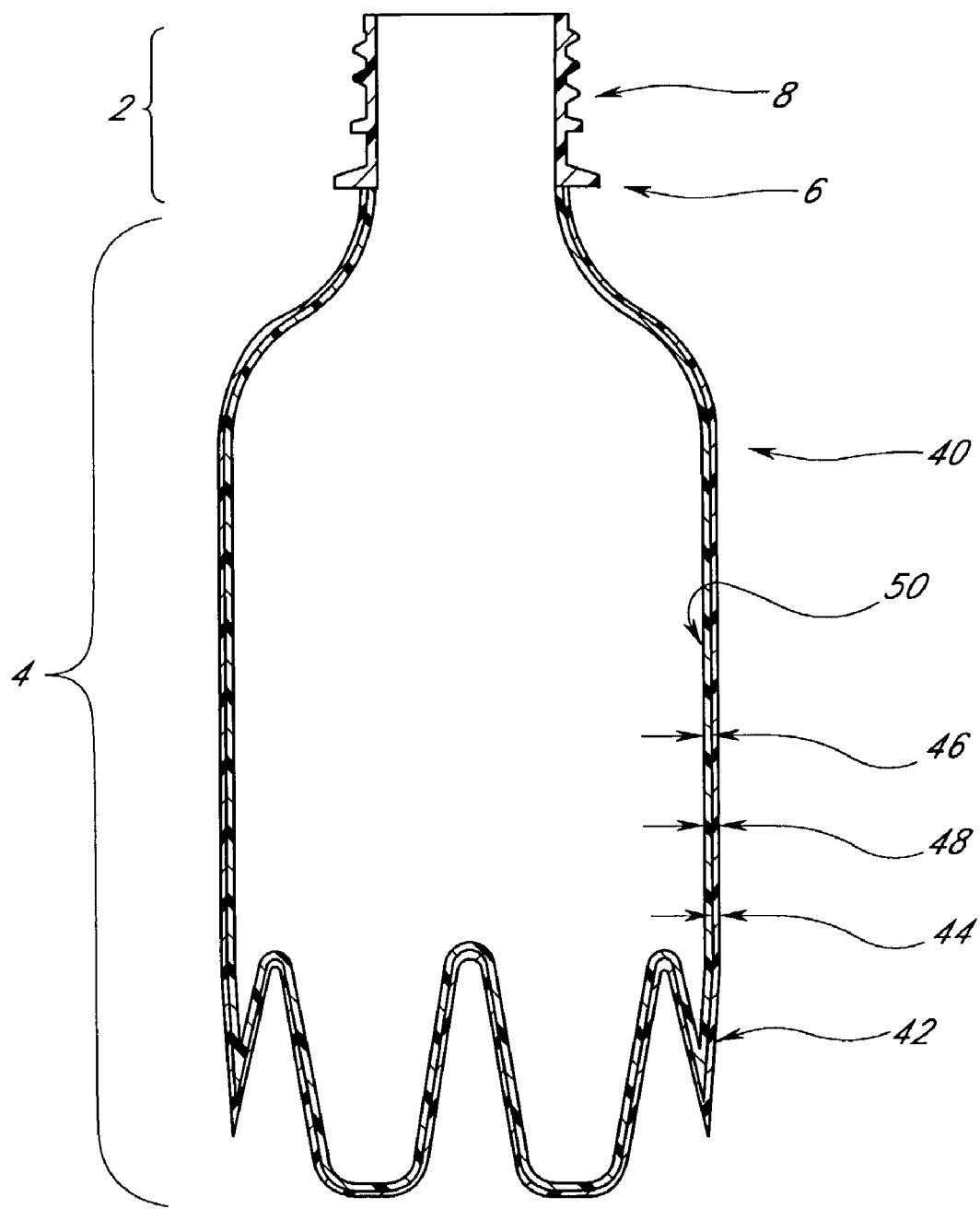
FIG. 8 is a cross-section of one preferred embodiment of barrier-coated container of the present invention.

When the barrier-coated container 40 is viewed in cross-section, as in FIG. 8, the construction can be seen. The barrier coating 42 covers the exterior of the entire body portion 4 of the container 40, stopping just below the support ring 6. The interior surface 50 of the container, which is made of an FDA-approved material, preferably PET, remains uncoated so that only the interior surface is in contact with beverages or foodstuffs. In one preferred embodiment that is used as a carbonated beverage container, the thickness of the barrier coating is preferably 0.020-0.060 inch (0.51-1.52 mm), more preferably 0.030-0.040 inch (0.76-1.02 mm); the thickness of the PET layer 46 is preferably 0.080-0.160 inch (2.03-4.064 mm), more preferably 0.100-0.140 inch (2.540-3.556 mm); and the overall wall thickness 48 of the barrier-coated container 40 is preferably 0.140-0.180 inch (3.556-4.572 mm), more preferably 0.150-0.170 inch (3.810-4.318 mm). Preferably, on average, the overall wall thickness 48 of the container 40 derives the majority of its thickness from the inner PET layer.

Figure 9:
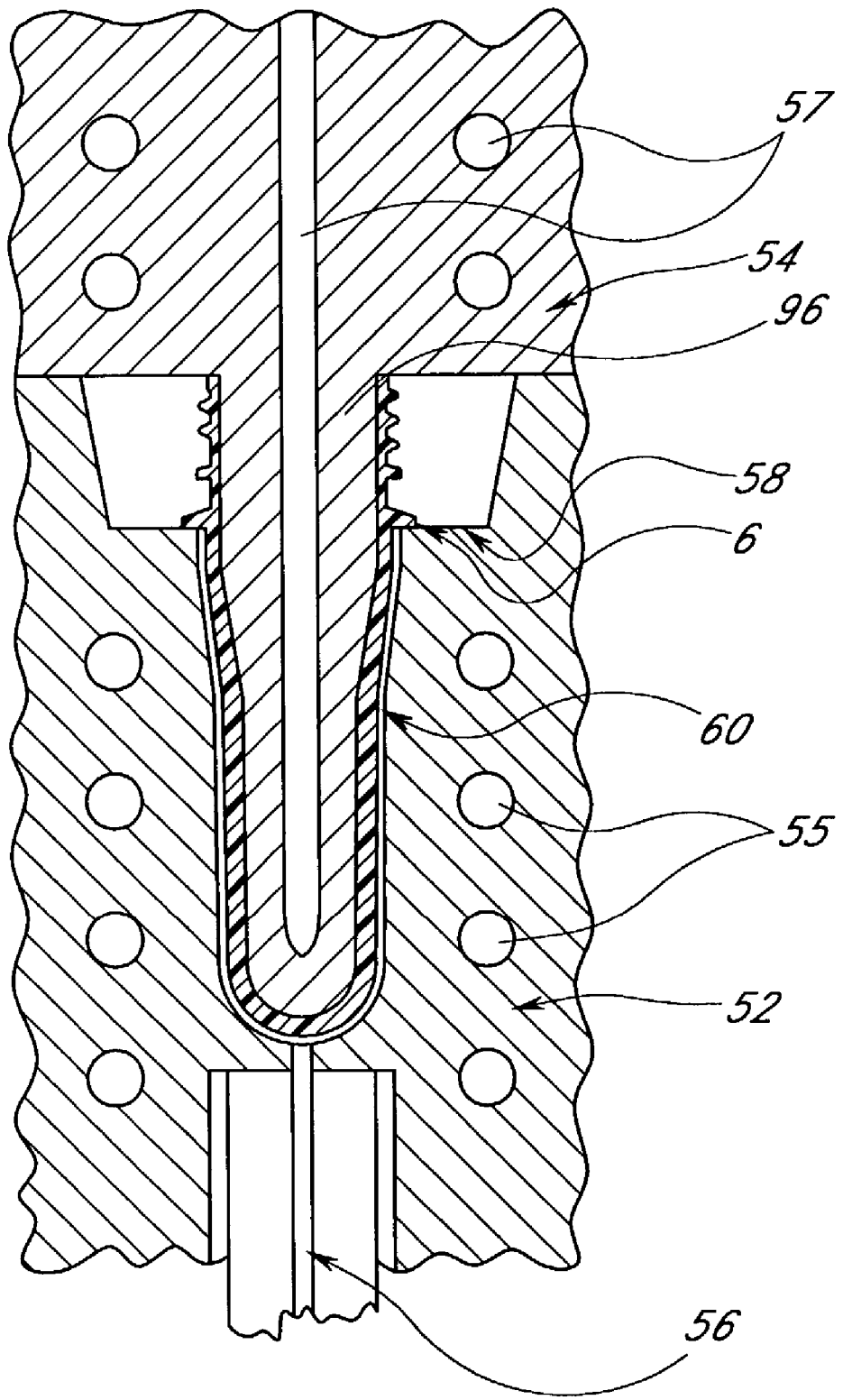
FIG. 9 is a cross-section of an injection mold of a type that may be used to make a preferred barrier-coated preform of the present invention.

FIG. 9 illustrates a preferred type of mold for use in methods which utilize overmolding. The mold comprises two halves, a cavity half 52 and a mandrel half 54. The cavity half 52 comprises a cavity in which an uncoated preform is placed. The preform is held in place between the mandrel half 54, which exerts pressure on the top of the preform and the ledge 58 of the cavity half 52 on which the support ring 6 rests. The neck portion of the preform is thus sealed off from the body portion of the preform. Inside the preform is the mandrel 96. As the preform sits in the mold, the body portion of the preform is completely surrounded by a void space 60. The preform, thus positioned, acts as an interior die mandrel in the subsequent injection procedure, in which the melt of the overmolding material is injected through the gate 56 into the void space 60 to form the coating. The melt, as well as the uncoated preform, is cooled by fluid circulating within channels 55 and 57 in the two halves of the mold. Preferably the circulation in channels 55 is completely separate from the circulation in the channels 57.

Figure 10:
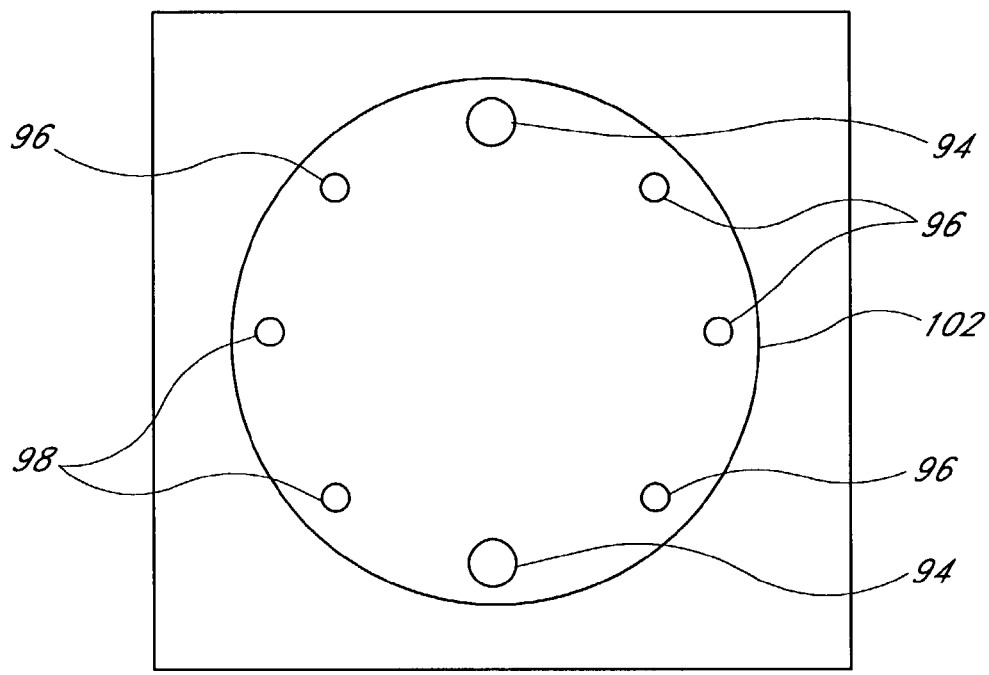
FIGS. 10 and 11 are two halves of a molding machine to make barrier-coated preforms.
Figure 11:
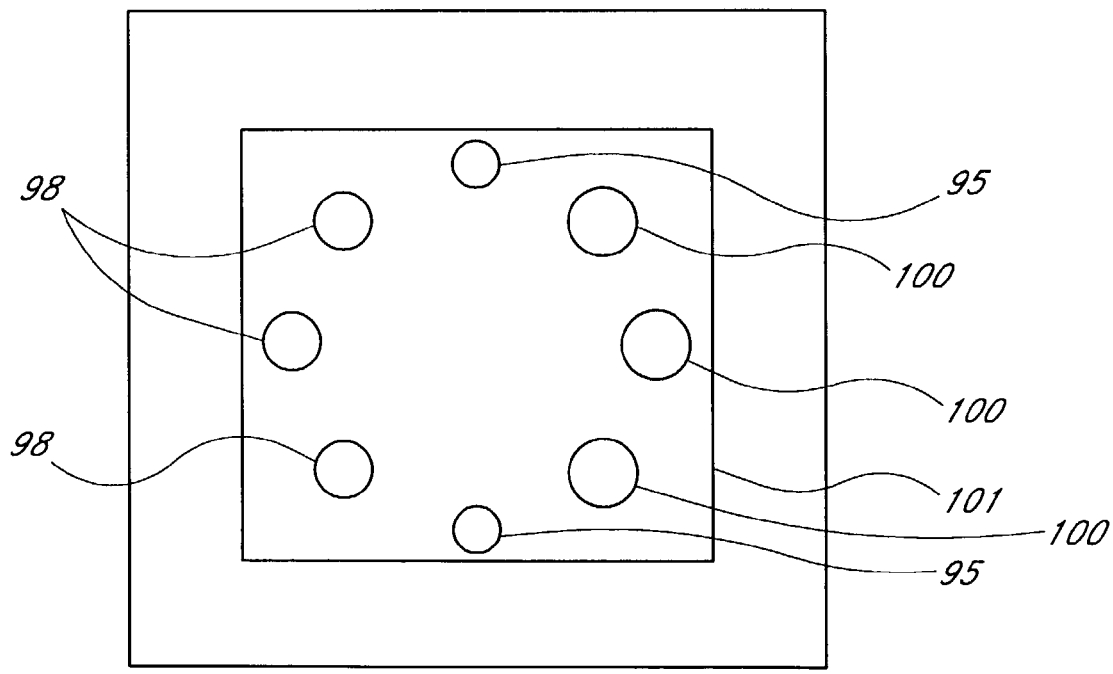

FIGS. 10 and 11 are a schematic of a portion of the preferred type of apparatus to make coated preforms in accordance with the present invention. The apparatus is an injection molding system designed to make one or more uncoated preforms and subsequently coat the newly-made preforms by over-injection of a barrier material. FIGS. 10 and 11 illustrate the two halves of the mold portion of the apparatus which will be in opposition in the molding machine. The alignment pegs 94 in FIG. 11 fit into their corresponding receptacles 95 in the other half of the mold.

The mold half depicted in FIG. 11 has several pairs of mold cavities, each cavity being similar to the mold cavity depicted in FIG. 9. The mold cavities are of two types: first injection preform molding cavities 98 and second injection preform coating cavities 100. The two types of cavities are equal in number and are preferably arranged so that all cavities of one type are on the same side of the injection block 101 as bisected by the line between the alignment peg receptacles 95. This way, every preform molding cavity 98 is 180 away from a preform coating cavity 100.

The mold half depicted in FIG. 10 has several mandrels 96, one for each mold cavity (98 and 100). When the two halves which are FIGS. 10 and 11 are put together, a mandrel 96 fits inside each cavity and serves as the mold for the interior of the preform for the preform molding cavities 98 and as a centering device for the uncoated preforms in preform coating cavities 100, filling what becomes the interior space of the preform after it is molded. The mandrels are mounted on a turntable 102 which rotates 180 about its center so that a mandrel originally positioned over a preform molding cavity 98 will, after rotation, be positioned over a preform coating cavity 100, and vice-versa. As described in greater detail below, this type of setup allows a preform to be molded and then coated in a two-step process using the same piece of equipment.

It should be noted that the drawings in FIGS. 10 and 11 are merely illustrative. For instance, the drawings depict an apparatus having three molding cavities 98 and three coating cavities 100 (a 3/3 cavity machine). However, the machines may have any number of cavities, as long as there are equal numbers of molding and coating cavities, for example 12/12, 24/24, 48/48 and the like. The cavities may be arranged in any suitable manner, as can be determined by one skilled in the art. These and other minor alterations are contemplated as part of this invention.

Figure 12:
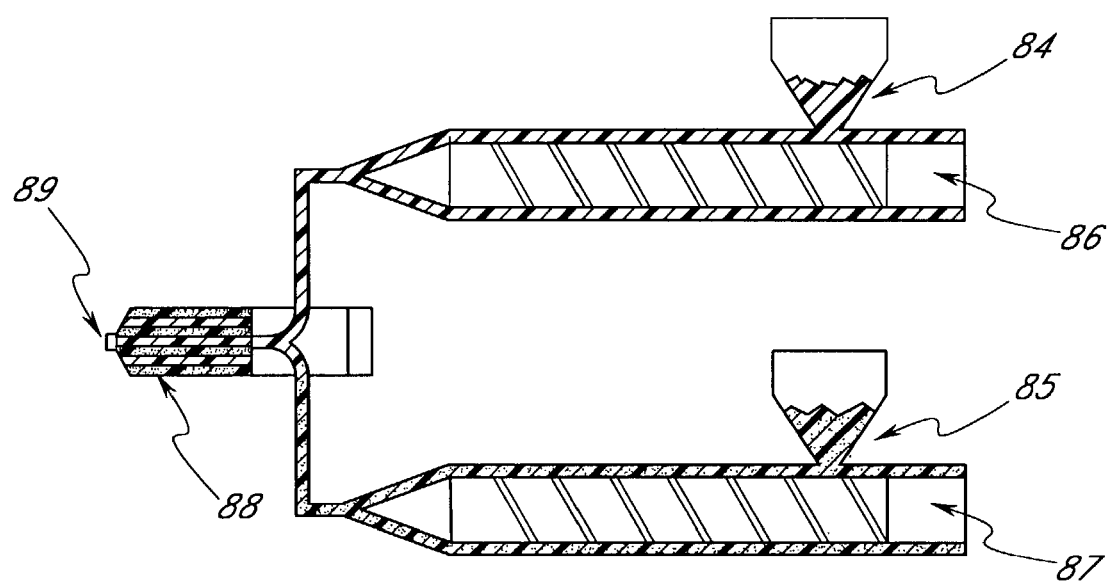
FIG. 12 is a schematic of a lamellar injection molding (LIM) system.

Referring to FIG. 12, there is shown a schematic of an apparatus which may be used to produce a meltstream comprised of numerous microlayers or lamellae in a lamellar injection molding (LIM) process as described in further detail below.

Figure 13:
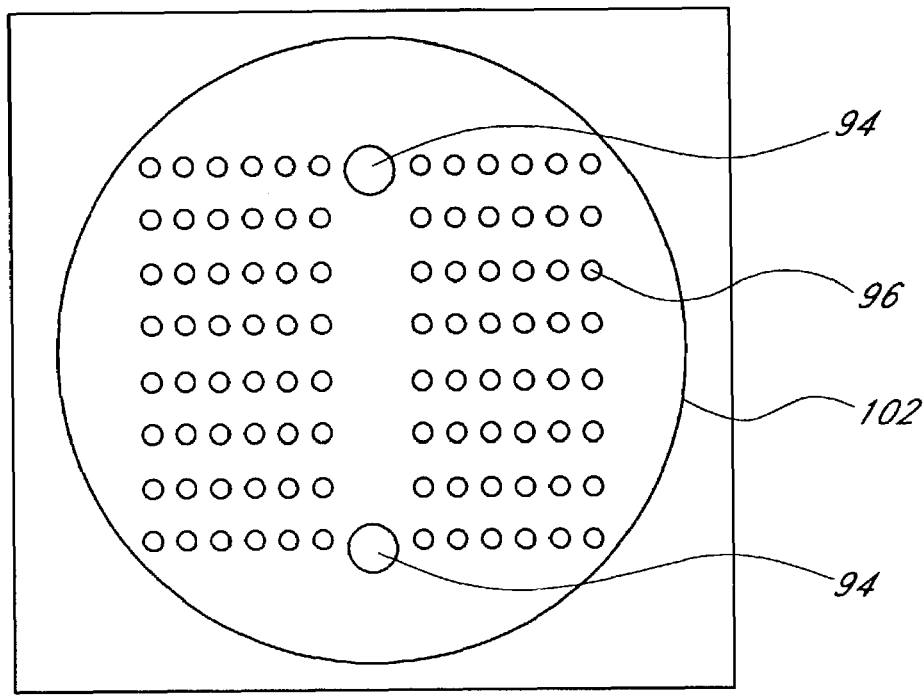
FIGS. 13 and 14 are two halves of a molding machine to make forty-eight two-layer preforms.
Figure 14:
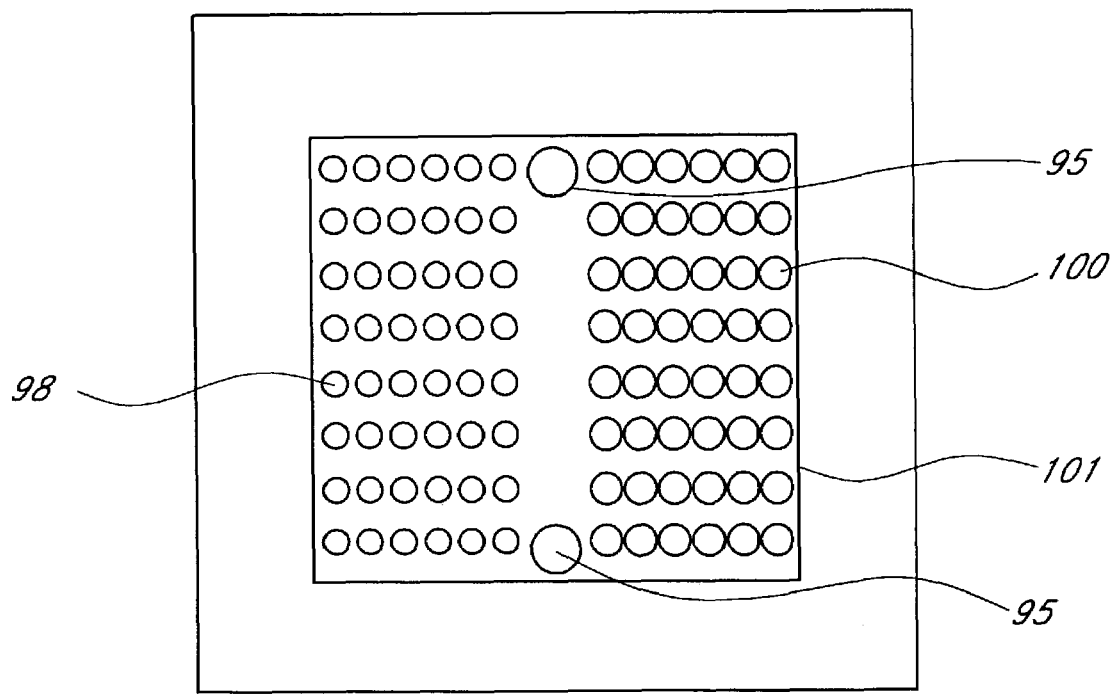

The two mold halves depicted in FIGS. 13 and 14 illustrate an embodiment of a mold of a 48/48 cavity machine as discussed for FIGS. 10 and 11.

Figure 15:
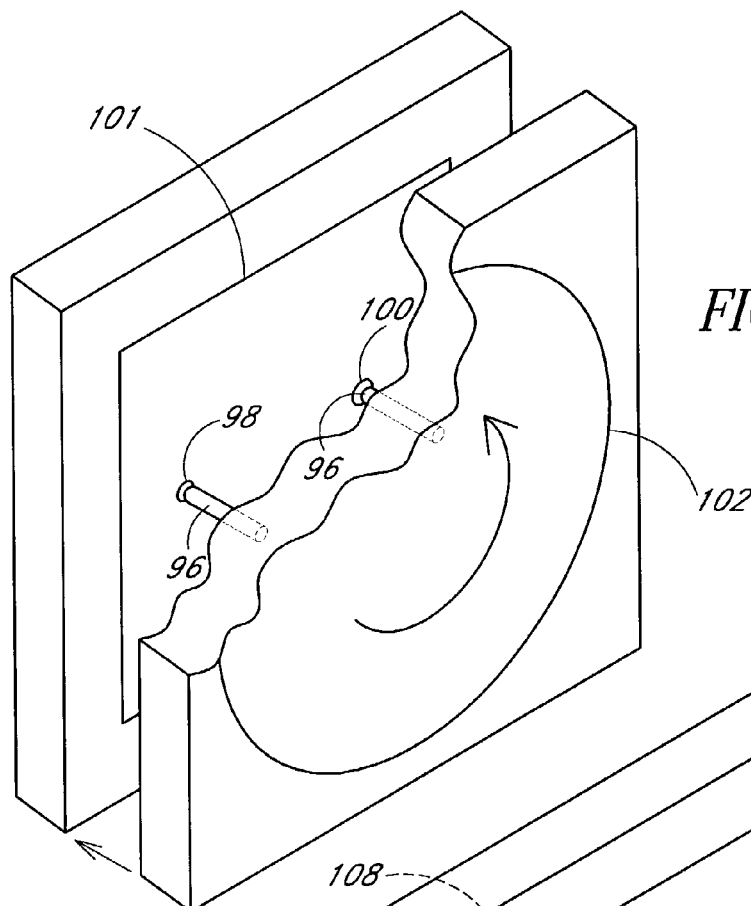
FIG. 15 is a perspective view of a schematic of a mold with mandrels partially located within the molding cavities.

Referring to FIG. 15 there is shown a perspective view of a mold of the type for an overmolding (inject-over-inject) process., in which the mandrels 96 are partially located within the cavities 98 and 100. The arrow shows the movement of the movable mold half, on which the mandrels 96 lie, as the mold closes.

Figure 16:
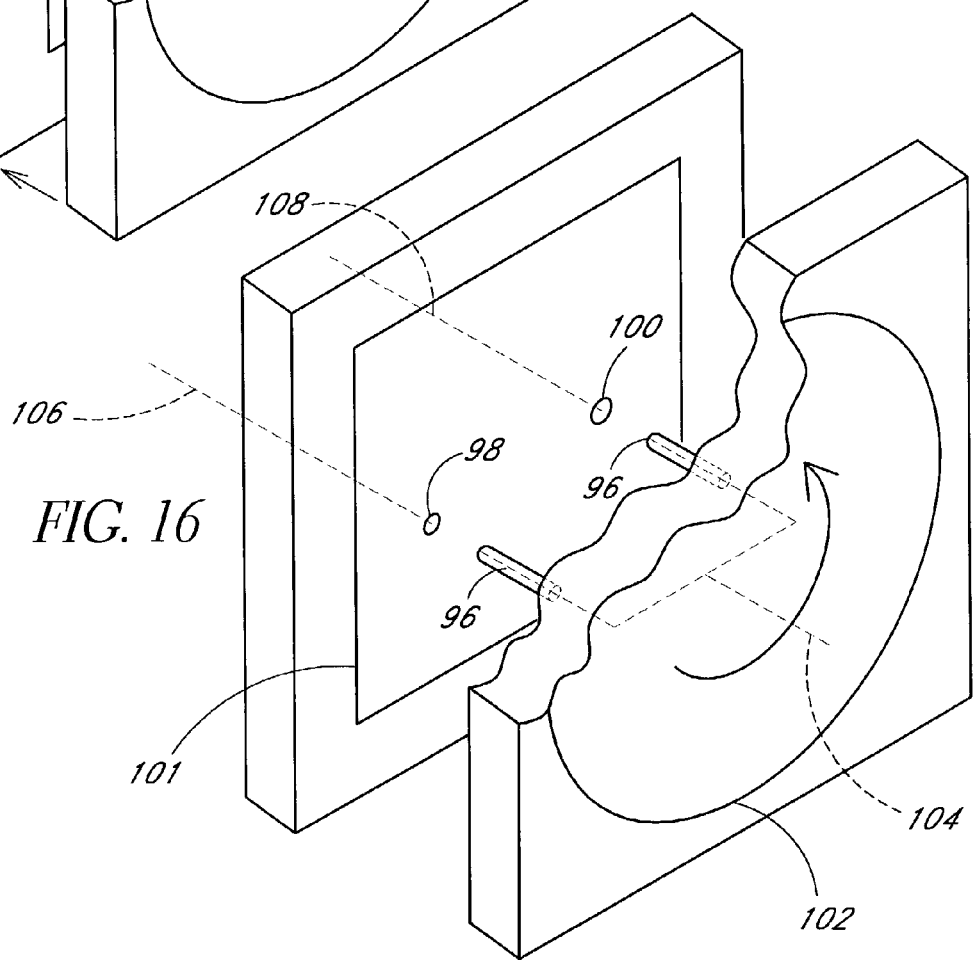
FIG. 16 is a perspective view of a mold with mandrels fully withdrawn from the molding cavities, prior to rotation.

FIG. 16 shows a perspective view of a mold of the type used in an overmolding process, wherein the mandrels 96 are fully withdrawn from the cavities 98 and 100. The arrow indicates that the turntable 102 rotates 180 to move the mandrels 96 from one cavity to the next. Also shown are schematics depicting the cooling means for the mold halves. On the stationary half, the cooling for the preform molding cavity 106 is separate from the cooling for the preform coating cavity 108. Both of these are separate from the cooling for the mandrels 104 in the movable half.

Figure 17:
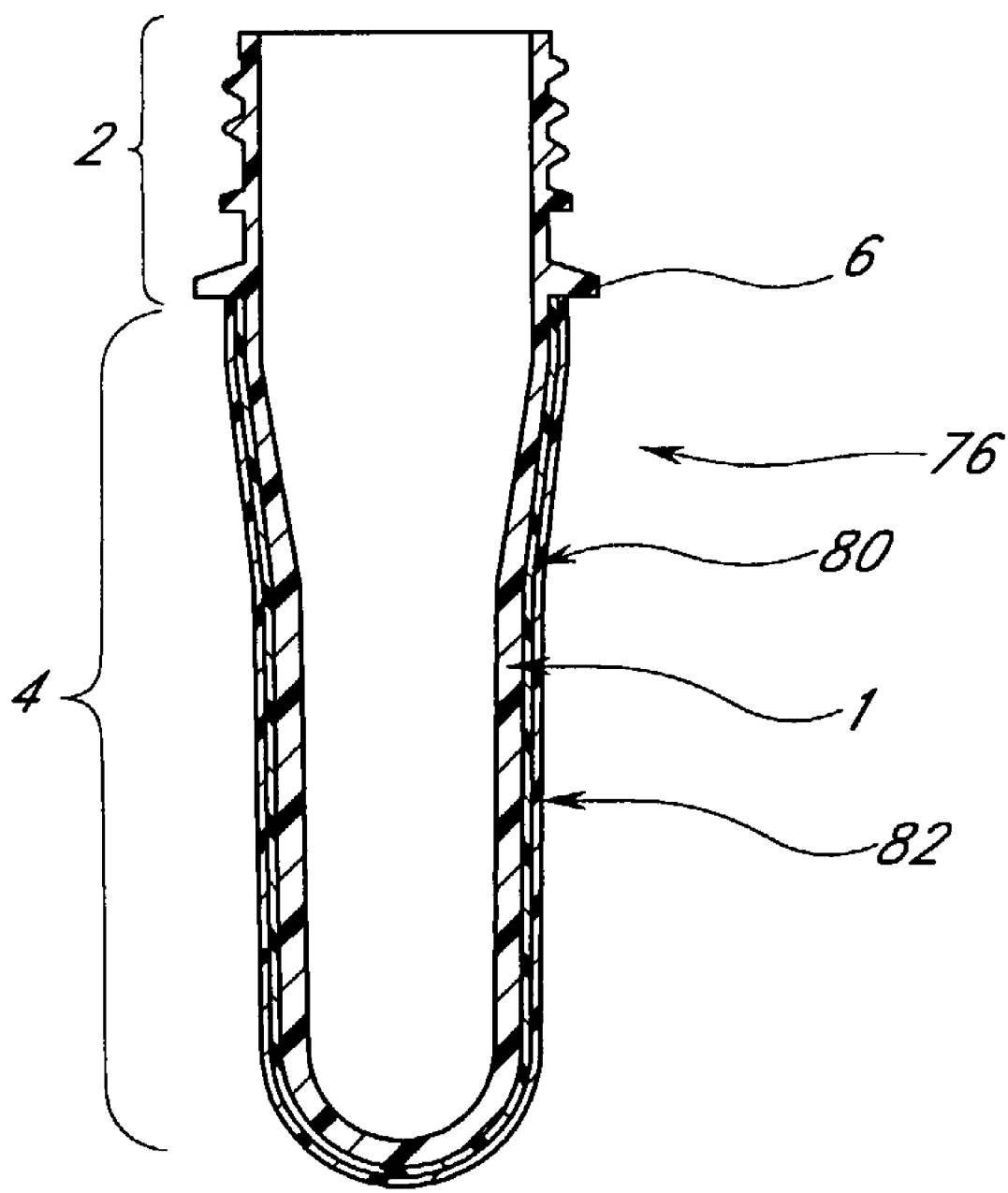
FIG. 17 is a three-layer embodiment of a preform.

Referring to FIG. 17 there is shown a preferred three-layer preform of the present invention. This embodiment of coated preform is preferably made by placing two coating layers 80 and 82 on a preform such as that shown in FIG. 1.

C. Physical Characteristics of Preferred Barrier Materials

Preferred barrier materials in accordance with the present invention preferably exhibit several physical characteristics which allow for the barrier coated bottles and articles of the present invention to be able to withstand processing and physical stresses in a manner similar or superior to that of uncoated PET articles, in addition to producing articles which are cosmetically appealing and have excellent barrier properties.

Adhesion is the union or sticking together of two surfaces. The actual interfacial adhesion is a phenomenon which occurs at the microscopic level. It is based upon molecular interactions and depends upon chemical bonding, van der Waals forces and other intermolecular attractive forces at the molecular level.

Good adhesion between the barrier layer and the PET layer is especially important when the article is a barrier bottle made by blow-molding a preform. If the materials adhere well, then they will act as one unit when they are subjected to a blow molding process and as they are subjected to stresses when existing in the form of a container. Where the adhesion is poor, delamination results either over time or under physical stress such as squeezing the container or the container jostling during shipment. Delamination is not only unattractive from a commercial standpoint, it may be evidence of a lack of structural integrity of the container. Furthermore, good adhesion means that the layers will stay in close contact when the container is expanded during the molding process and will move as one unit. When the two materials act in such a manner, it is less likely that there will be voids in the coating, thus allowing a thinner coating to be applied. The barrier materials of the present invention preferably adhere sufficiently to PET such that the barrier layer cannot be easily pulled apart from the PET layer at 22 C.

Thus, due in part to the direct adhesion of the barrier layer to the PET, the present invention differs from that disclosed by Farha in U.S. Pat. No., 5,472,753. In Farha, there is not disclosed, nor is the suggestion made, that the phenoxy-type thermoplastic can or should be bound directly to the PET without being blended with the copolyester or using the copolyester as a tie layer or that a copolyester itself could be used as a barrier material.

The glass transition temperature (Tg) is defined as the temperature at which a non-crystallizable polymer undergoes the transformation from a soft rubber state to a hard elastic polymer glass. In a range of temperatures above its Tg, a material will become soft enough to allow it to flow readily when subjected to an external force or pressure, yet not so soft that its viscosity is so low that it acts more like a liquid than a pliable solid. The temperature range above Tg is the preferred temperature range for performing a blow-molding process, as the material is soft enough to flow under the force of the air blown into the preform to fit the mold but not so soft that it breaks up or becomes uneven in texture. Thus, when materials have similar glass transition temperatures, they will have similar preferred blowing temperature ranges, allowing the materials to be processed together without compromising the performance of either material.

In the blow-molding process to produce bottle from a preform, as is known in the art, the preform is heated to a temperature slightly above the Tg of the preform material so that when air is forced into the preform's interior, it will be able to flow to fill the mold in which it is placed. If one does not sufficiently heat the preform and uses a temperature below the Tg, the preform material will be too hard to flow properly, and would likely crack, craze, or not expand to fill the mold. Conversely, if one heats the preform to a temperature well above the Tg, the material would likely become so soft that it would not be able to hold its shape and would process improperly.

If a barrier coating material has a Tg similar to that of PET, it will have a blowing temperature range similar to PET. Thus, if a PET preform is coated with such a barrier material, a blowing temperature can be chosen that allows both materials to be processed within their preferred blowing temperature ranges. If the barrier coating were to have a Tg dissimilar to that of PET, it would be difficult, if not impossible, to choose a blowing temperature suitable for both materials. When the barrier coating materials have a Tg similar to PET, the coated preform behaves during blow molding as if it were made of one material, expanding smoothly and creating a cosmetically appealing container with an even thickness and uniform coating of the barrier material where it is applied.

The glass transition temperature of PET occurs in a window of about 75-85 C., depending upon how the PET has been processed previously. The Tg for preferred barrier materials of the present invention is preferably 55 to 140 C., more preferably 90 to 110 C.

Another factor which has an impact on the performance of barrier preforms during blow molding is the state of the material. The preferred barrier materials of the present invention are amorphous rather than crystalline. This is because materials in an amorphous state are easier to form into bottles and containers by use of a blow molding process than materials in a crystalline state. PET can exist in both crystalline and amorphous forms. However, in the present invention it is highly preferred that the PET exist in the amorphous form in order to, among other things, aid in the blow molding process. A PET article formed from a melt of PET, as in injection molding, can be guided into the amorphous form by cooling the melt at a high rate, fast enough to quench the crystallization process and trap the amorphous state.

Intrinsic viscosity and melt index are two properties which are related to a polymer's molecular weight. These properties give an indication as to how materials will act under various processing conditions, such as injection molding and blow molding processes.

Barrier materials for use in the articles and methods of the present invention have an intrinsic viscosity of preferably 0.70-0.90 dl/g, more preferably 0.74-0.87 dl/g, most preferably 0.84-0.85 dl/g and a melt index of preferably 5-30, more preferably 7-12, most preferably 10.

Barrier materials of the present invention preferably have tensile strength and creep resistance similar to PET. Similarity in these physical properties allows the barrier coating to act as more than simply a gas barrier. A barrier coating having physical properties similar to PET acts as a structural component of the container, allowing the barrier material to displace some of the polyethylene terephthalate in the container without sacrificing container performance. Displacement of PET allows for the resulting barrier-coated containers to have physical performance and characteristics similar to their uncoated counterparts without a substantial change in weight or size. It also allows for any additional cost from adding the barrier material to be defrayed by a reduction in the cost per container attributed to PET.

Similarity in tensile strength between PET and the barrier coating materials helps the container to have structural integrity. This is especially important if some PET is displaced by barrier material. Barrier-coated bottles and containers of the present invention are able to withstand the same physical forces as an uncoated container, allowing, for example, barrier-coated containers to be shipped and handled in the customary manner of handling uncoated PET containers. If the barrier-coating material were to have a tensile strength substantially lower than that of PET, a container having some PET displaced by barrier material would likely not be able to withstand the same forces as an uncoated container.

Similarity in creep resistance between PET and the barrier coating materials helps the container to retain its shape. Creep resistance relates to the ability of a material to resist changing its shape in response to an applied force. For example, a bottle which holds a carbonated liquid needs to be able to resist the pressure of dissolved gas pushing outward and retain its original shape. If the barrier coating material were to have a substantially lower resistance to creep than PET in a container wherein the resulting container would be more likely to deform over time, reducing the shelf-life of the product.

For applications where optical clarity is of importance, preferred barrier materials have an index of refraction similar to that of PET.

When the refractive index of the PET and the barrier coating material are similar, the preforms and, more perhaps importantly, the blown therefrom are optically clear and, thus, cosmetically appealing for use as a beverage container where clarity of the bottle is frequently desired. If, however, the two materials have substantially dissimilar refractive indices when they are placed in contact with each other the resulting combination will have visual distortions and may be cloudy or opaque, depending upon the degree of difference in the refractive indices of the materials.

Polyethylene terephthalate has an index of refraction for visible light within the range of about 1.40 to 1.75, depending upon its physical configuration. When made into preforms, the refractive index is preferably within the range of about 1.55 to 1.75, and more preferably in the range of 1.55-1.65. After the preform is made into a bottle, the walls of the final product, which may be characterized as a biaxially-oriented film since it is subject to both hoop and axial stresses in the blow molding operation, polyethylene terephthalate generally exhibits a refractive index within the range of about 1.40 to 1.75, usually about 1.55 to 1.75, depending upon the stretch ratio involved in the blow molding operation. For relatively low stretch ratios of about 6:1, the refractive index will be near the lower end, whereas for high stretch ratios, about 10:1, the refractive index will be near the upper end of the aforementioned range. It will be recognized that the stretch ratios referred to herein are biaxial stretch ratios resulting from and include the product of the hoop stretch ratio and the axial stretch ratio. For example, in a blow molding operation in which the final preform is enlarged by a factor of 2.5 in the axial direction and a factor of 3.5 diametrically, the stretch ratio will be about 8.75 (2.5×3.5).

Using the designation $n_i$ to indicate the refractive index for PET and $n_o$ to indicate the refractive index for the barrier material, the ratio between the values $n_i$ and $n_o$ is preferably 0.8-1.3, more preferably 1.0-1.2, most preferably 1.0-1.1. As will be recognized by those skilled in the art, for the ratio $n_i/n_o=1$ the distortion due to refractive index will be at a minimum, because the two indices are identical.

As the ratio progressively varies from one, however, the distortion increases progressively.

D. Preferred Barrier Coating Materials and Their Preparation

The preferred barrier coating materials for use in the articles and methods of the present invention are Phenoxy-type Thermoplastic materials and copolyesters of terephthalic acid, isophthalic acid, and at least one diol (Copolyester Barrier Materials). Preferably, the Phenoxy-type Thermoplastics used as barrier materials in the present invention are one of the following types:

(1) hydroxy-functional poly(amide ethers) having repeating units represented by any one of the Formulae Ia, Ib or Ic:

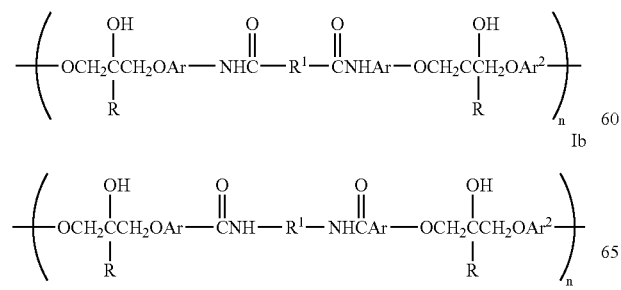

(2) poly(hydroxy amide ethers) having repeating units represented independently by any one of the Formulae IIa, IIb or IIc:

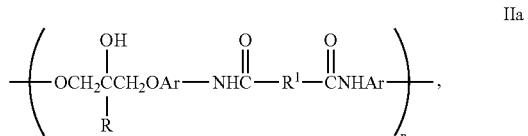

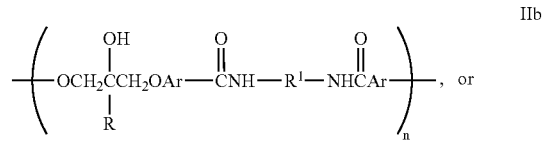

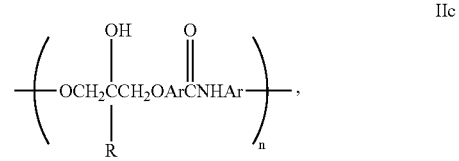

(3) amide- and hydroxymethyl-functionalized polyethers having repeating units represented by Formula III:

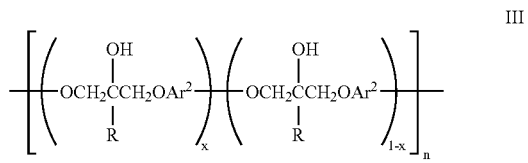

(4) hydroxy-functional polyethers having repeating units represented by Formula IV:

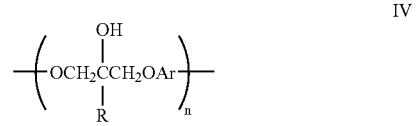

(5) hydroxy-functional poly(ether sulfonamides) having repeating units represented by Formulae Va or Vb:

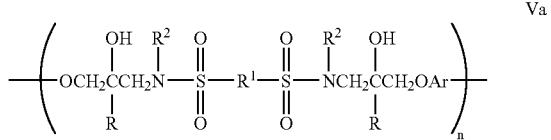

-continued

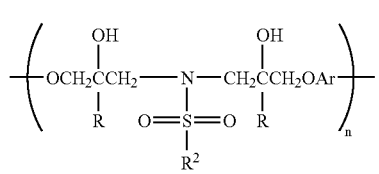

(6) poly(hydroxy ester ethers) having repeating units represented by Formula VI:

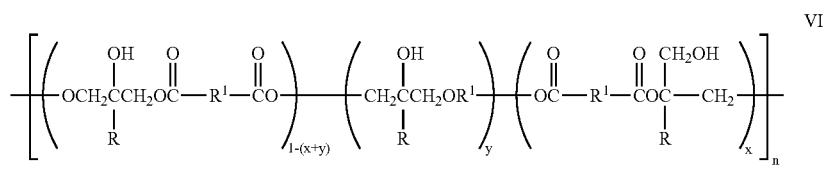

(7) hydroxy-phenoxyether polymers having repeating units represented by Formula VII:

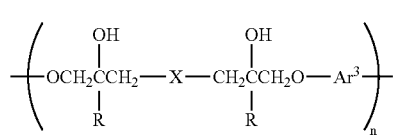

and (8) poly(hydroxyamino ethers) having repeating units represented by Formula VIII:

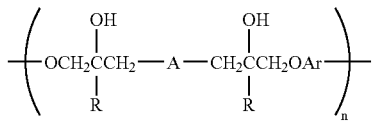

wherein each Ar individually represents a divalent aromatic moiety, substituted divalent aromatic moiety or heteroaromatic moiety, or a combination of different divalent aromatic moieties, substituted aromatic moieties or heteroaromatic moieties; R is individually hydrogen or a monovalent hydrocarbyl moiety; each $Ar_1$ is a divalent aromatic moiety or combination of divalent aromatic moieties bearing amide or hydroxymethyl groups; each $Ar_2$ is the same or different than Ar and is individually a divalent aromatic moiety, substituted aromatic moiety or heteroaromatic moiety or a combination of different divalent aromatic moieties, substituted aromatic moieties or heteroaromatic moieties; $R_1$ is individually a predominantly hydrocarbylene moiety, such as a divalent aromatic moiety, substituted divalent aromatic moiety, divalent heteroaromatic moiety, divalent alkylene moiety, divalent substituted alkylene moiety or divalent heteroalkylene moiety or a combination of such moieties; $R_2$ is individually a monovalent hydrocarbyl moiety; A is an amine moiety or a combination of different amine moieties; X is an amine, an arylenedioxy, an arylenedisulfonamido or an arylenedicarboxy moiety or combination of such moieties; and $Ar_3$ is a "cardo" moiety represented by any one of the Formulae:

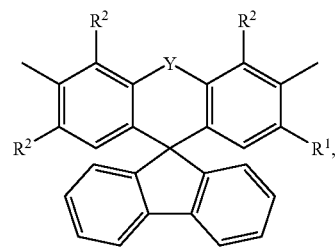

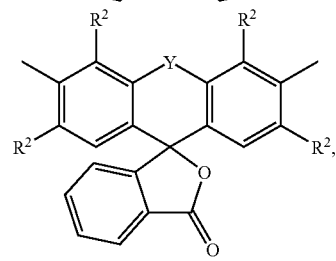

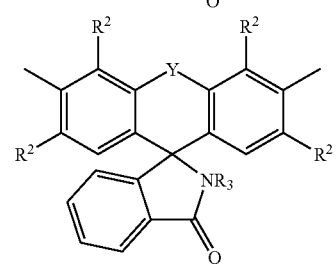

wherein Y is nil, a covalent bond, or a linking group, wherein suitable linking groups include, for example, an oxygen atom, a sulfur atom, a carbonyl atom, a sulfonyl group, or a methylene group or similar linkage; n is an integer from about 10 to about 1000; x is 0.01 to 1.0; and y is 0 to 0.5.

The term "predominantly hydrocarbylene" means a divalent radical that is predominantly hydrocarbon, but which optionally contains a small quantity of a heteroatomic moiety such as oxygen, sulfur, imino, sulfonyl, sulfoxyl, and the like.

The hydroxy-functional poly(amide ethers) represented by Formula I are preferably prepared by contacting an N,N'-bis(hydroxyphenylamido)alkane or arene with a diglycidyl ether as described in U.S. Pat. Nos. 5,089,588 and 5,143,998.

The poly(hydroxy amide ethers) represented by Formula II are prepared by contacting a bis(hydroxyphenylamido) alkane or arene, or a combination of 2 or more of these compounds, such as N,N'-bis(3-hydroxyphenyl) adipamide or N,N'-bis(3-hydroxyphenyl)glutaramide, with an epihalohydrin as described in U.S. Pat. No. 5,134,218.

The amide- and hydroxymethyl-functionalized polyethers represented by Formula III can be prepared, for example, by reacting the diglycidyl ethers, such as the diglycidyl ether of bisphenol A, with a dihydric phenol having pendant amido, N-substituted amido and/or hydroxyalkyl moieties, such as 2,2-bis(4-hydroxyphenyl)acetamide and 3,5-dihydroxybenzamide. These polyethers and their preparation are described in U.S. Pat. Nos. 5,115,075 and 5,218,075.

The hydroxy-functional polyethers represented by Formula IV can be prepared, for example, by allowing a diglycidyl ether or combination of diglycidyl ethers to react with a dihydric phenol or a combination of dihydric phenols using the process described in U.S. Pat. No. 5,164,472. Alternatively, the hydroxy-functional polyethers are obtained by allowing a dihydric phenol or combination of dihydric phenols to react with an epihalohydrin by the process described by Reinking, Barnabeo and Hale in the Journal of Applied Polymer Science, Vol. 7, p. 2135 (1963).

The hydroxy-functional poly(ether sulfonamides) represented by Formula V are prepared, for example, by polymerizing an N,N'-dialkyl or N,N'-diaryldisulfonamide with a diglycidyl ether as described in U.S. Pat. No. 5,149,768.

The poly(hydroxy ester ethers) represented by Formula VI are prepared by reacting diglycidyl ethers of aliphatic or aromatic diacids, such as diglycidyl terephthalate, or diglycidyl ethers of dihydric phenols with, aliphatic or aromatic diacids such as adipic acid or isophthalic acid. These polyesters are described in U.S. Pat. No. 5,171,820.

The hydroxy-phenoxyether polymers represented by Formula VII are prepared, for example, by contacting at least one dinucleophilic monomer with at least one diglycidyl ether of a cardo bisphenol, such as 9,9-bis(4-hydroxyphenyl) fluorene, phenolphthalein, or phenolphthalimidine or a substituted cardo bisphenol, such as a substituted bis(hydroxyphenyl)fluorene, a substituted phenolphthalein or a substituted phenolphthalimidine under conditions sufficient to cause the nucleophilic moieties of the dinucleophilic monomer to react with epoxy moieties to form a polymer backbone containing pendant hydroxy moieties and ether, imino, amino, sulfonamido or ester linkages. These hydroxy-phenoxyether polymers are described in U.S. Pat. No. 5,184,373.

The poly(hydroxyamino ethers) ("PHAE" or polyetheramines) represented by Formula VIII are prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These compounds are described in U.S. Pat. No. 5,275,853.

Phenoxy-type Thermoplastics of Formulae I-VIII may be acquired from Dow Chemical Company (Midland, Mich. U.S.A.).

The Phenoxy-type Thermoplastics commercially available from Phenoxy Associates, Inc. are suitable for use in the present invention. These hydroxy-phenoxyether polymers are the condensation reaction products of a dihydric polynuclear phenol, such as bisphenol A, and an epihalohydrin and have the repeating units represented by Formula IV wherein Ar is an isopropylidene diphenylene moiety. The process for preparing these is described in U.S. Pat. No. 3,305,528, incorporated herein by reference in its entirety.

The most preferred Phenoxy-type Thermoplastics are the poly(hydroxyamino ethers) ("PHAE") represented by Formula VIII. An example is that sold as XU19040.00L by Dow Chemical Company.

Examples of preferred Copolyester Barrier Materials and a process for their preparation is described in U.S. Pat. No. 4,578,295 to Jabarin. They are generally prepared by heating a mixture of at least one reactant selected from isophthalic acid, terephthalic acid and their $C_1$, to $C_4$ alkyl esters with 1,3 bis(2-hydroxyethoxy)benzene and ethylene glycol. Optionally, the mixture may further comprise one or more ester-forming dihydroxy hydrocarbon and/or bis(4-β-hydroxyethoxyphenyl)sulfone.

The most preferred Copolyester Barrier Materials are those which are made from mixtures comprising both terephthalic acid and isophthalic acid. An especially preferred Copolyester Barrier Material is available as B-010 from Mitsui Petrochemical Ind. Ltd. (Japan).

E. Preparation of Polyesters

Polyesters and methods for their preparation (including the specific monomers employed in their formation, their proportions, polymerization temperatures, catalysts and other conditions) are well-known in the art and reference is made thereto for the purposes of this invention. For purposes of illustration and not limitation, reference is particularly made to pages 1-62 of Volume 12 of the Encyclopedia of Polymer Science and Engineering, 1988 revision, John Wiley & Sons.

Typically, polyesters are derived from the reaction of a di- or polycarboxylic acid with a di- or polyhydric alcohol. Suitable di- or polycarboxylic acids include polycarboxylic acids and the esters and anhydrides of such acids, and mixture thereof. Representative carboxylic acids include phthalic, isophthalic, adipic azelaic, terephthalic, oxalic, malonic, succinic, glutaric, sebacic, and the like. Dicarboxylic components are preferred. Terephthalic acid is most commonly employed and preferred in the preparation of polyester films. α,β-Unsaturated di- and polycarboxylic acids (including esters or anhydrides of such acids and mixtures thereof) can be used as partial replacement for the saturated carboxylic components. Representative α,β-unsaturated di- and polycarboxylic acids include maleic, fumaric, aconitic, itaconic, mesaconic, citraconic, monochloromaleic and the like.

Typical di- and polyhydric alcohols used to prepare the polyester are those alcohols having at least two hydroxy groups, although minor amounts of alcohol having more or less hydroxy groups may be used. Dihydroxy alcohols are preferred. Dihydroxy alcohols conventionally employed in the preparation of polyesters include diethylene glycol; dipropylene glycol; ethylene glycol; 1,2-propylene glycol; 1,4-butanediol; 1,4-pentanediol; 1,5-hexanediol, 1,4-cyclohexanedimethanol and the like with 1,2-propylene glycol being preferred. Mixtures of the alcohols can also be employed. The di- or polyhydric alcohol component of the polyester is usually stoichiometric or in slight excess with respect to the acid. The excess of the di- or polyhydric alcohol will seldom exceed about 20 to 25 mole percent and usually is between about 2 and about 10 mole percent.

The polyester is generally prepared by heating a mixture of the di- or polyhydric alcohol and the di- or polycarboxylic component in their proper molar ratios at elevated temperatures, usually between about 100 C. and 250 C. for extended periods of time, generally ranging from 5 to 15 hours. Polymerization inhibitors such as t-butylcatechol may advantageously be used.

PET, the preferred polyester, may be purchased from Dow Chemical Company (Midland, Mich.), and Allied Signal Inc.(Baton Rouge, La.), among others.

F. Materials to Enhance Barrier Properties of Barrier Resins

The barrier materials disclosed above may be used in combination with other materials which enhance the barrier properties. Generally speaking, one cause for the diffusion of gases through a material is the existence of gaps or holes in the material at the molecular level through which the gas molecules can pass. The presence of intermolecular forces in a material, such as hydrogen bonding, allows for interchain cohesion in the matrix which closes these gaps and discourages diffusion of gases. One may also increase the gas-barrier ability of good barrier materials by adding an additional molecule or substance which takes advantage of such intermolecular forces and acts as a bridge between polymer chains in the matrix, thus helping to close the holes in the matrix and reduce gas diffusion.

Derivatives of resorcinol (m-dihydroxybenzene), when reacted with other monomers in the manufacture of PHAE, PET, Copolyester Barrier Materials, and other barrier materials, will generally result in a material which has better barrier properties than the same material if it does not contain the resorcinol derivative. For example, resorcinol diglycidyl ether can be used in PHAE and hydroxyethyl ether resorcinol can be used in PET and other polyesters and Copolyester Barrier Materials.

One measure of the efficacy of a barrier is the effect that it has upon the shelf life of the material. The shelf life of a carbonated soft drink in a 32 oz PET non-barrier bottle is approximately 12-16 weeks. Shelf life is determined as the time at which less than 85% of the original amount of carbon dioxide is remaining in the bottle. Bottles coated with PHAE using the inject-over-inject method described below have been found to have a shelf life 2 to 3 times greater than that of PET alone. If, however, PHAE with resorcinol diglycidyl ether is used, the shelf life can be increased to 4 to 5 times that of PET alone.

Another way of enhancing the barrier properties of a material is to add a substance which "plugs" the holes in the polymer matrix and thus discourages gases from passing through the matrix. Alternatively, a substance may aid in creating a more tortuous path for gas molecules to take as they permeate a material. One such substance, referred to herein by the term "Nanoparticles" or "nanoparticular material" are tiny particles of materials which enhance the barrier properties of a material by creating a more tortuous path for migrating oxygen or carbon dioxide. One preferred type of nanoparticular material is a microparticular clay-based product available from Southern Clay Products.

G. Methods of Preparing Barrier-Coated Articles

Once a suitable barrier coating material is chosen, the coated preform must be made in a manner that promotes adhesion between the two materials. Generally, adherence between the barrier coating materials and PET increases as the surface temperature of the PET increases. Therefore, it is preferable to perform coating on heated preforms, although the preferred barrier materials of the present invention will adhere to PET at room temperature.

1. Dip Coating

One preferred method of producing a coated PET preform in accordance with the present invention is to dip coat the PET preform in a resin-containing solvent bath. The dipping of the preforms into the resin-containing bath can be done manually by the use of a retaining rack or the like, or it may be done by a fully automated process which may include the blow-molding process at the end.

The bath contains a solution made from one or more solvents into which the resin of the barrier material is dissolved and/or suspended. The term "solution" as used herein refers to end result of mixing solvent(s) and resin, whether the resulting combination is in solution, suspension, or some combination thereof. The resin may be used in any form, but as with most all materials, smaller sized particles go into solution faster than larger ones. If the barrier material is not very soluble in a given solvent, adding the resin as a powder will help create a more uniform suspension. A wide variety of solvents may be used, as well as solvent systems made of combinations of solvents. Preferred solvents include dimethylformamide (DMF), ethanol, tetrahydrofuran (THF), methylene chloride, water, acetone, benzene, toluene, Dowanol DPM, Dowanol PPH, and Dowanol PM, and mixtures thereof. Factors which influence the selection of solvent or solvent system include polarity, reactivity, solubility, boiling point, vapor pressure, and flammability. The dip-coating solutions of the present invention preferably contain 10-60% resin by weight, more preferably 20-50% resin by weight, most preferably 30-40% resin by weight. The temperature of the solution in the bath is preferably 0 to 100 C., more preferably 25 to 50 C.

The dip coating process begins by obtaining PET preforms. Preforms may be made by injecting a melt of PET into a mold in the shape of a preform. The mold is cooled, preferably at a rate that allows the molten PET to cool rapidly enough that it is amorphous rather than crystalline in form. Processes for making PET preforms by injection molding are generally well known in the art. The surface of the preform is preferably free of any oils, surfactants, mold release agents, or the like so that the barrier coating material can adhere directly to the PET.

The PET preforms are then dipped into the solution in the bath. Referring to FIG. 2, the preform is preferably dipped until at least the entire body portion 4 of the preform is submerged in the bath up to just under the support ring 6. The preform remains submerged in the bath preferably for 1 to 30 seconds, more preferably 2 to 5 seconds. The preform is then withdrawn from the bath and dried until no solvent remains on the preform. Drying may be done by any one of a number of methods, such as air-drying or placing the preforms under a vacuum and/or in a heated atmosphere as in an oven. The choice of method may depend upon the solvent chosen and the speed at which one desires the drying to take place. Additional dipping and drying steps may be done to create additional layers if desired. Preferably, further processing such as blow molding is done after the preform is dry.

Barrier coated preforms produced from dip-coating are preferably of the type seen in FIG. 3. The barrier coating 22 is disposed on the body portion 4 of the preform and does not coat the neck portion 2. The interior of the coated preform 16 is preferably not coated with barrier material. The thickness of the barrier coating is preferably 0.01 to 3 mm, more preferably 0.1 to 1 mm.

EXAMPLE 1

A sample of a Phenoxy-type Thermoplastic resin, specifically a PHAE available from Dow Chemical Company as XU19040.00L was obtained as small pellets. The pellets were dissolved in dimethylformamide to a concentration of 40% by weight. Eight identical 17.5 g virgin PET preforms of the type used to make a 16 oz. carbonated beverage bottle were placed in a rack and dipped into the bath containing the resin/DMF solution which was at room temperature (approximately 21-23 C.). After 5 seconds the preforms were removed from the bath and dried for 8 hours in an oven set at about 75 C.

Before dip-coating, the preforms weighed an average of 17.5 grams. After dip-coating the preforms weighted an average of 18.0 grams, having had 0.5 grams of resin coated thereon by the process.

2. Spray Coating

Another method of producing coated PET articles in accordance with the present invention is by spray coating. In this method, the PET preforms are sprayed with a solution of barrier resin dissolved or suspended in a solvent. The spraying of the preforms can be done manually or by use of an apparatus which provides for spraying and post-spray treatment in one machine.

The solution which is sprayed onto the preforms contains one or more solvents into which the resin of the barrier material is dissolved and/or suspended. A wide variety of solvents can be used, as well as solvent systems made of combinations of solvents. Preferred solvents include dimethylformamide (DMF), ethanol, tetrahydrofuran (THF), methylene chloride, water, acetone, benzene, toluene, Dowanol DPM, Dowanol PPH, and Dowanol PM, and mixtures thereof. The selection of what solvent or solvent system is used may depend on many factors such as polarity, reactivity, solubility, boiling point, vapor pressure, and flammability, as can be determined by one of skill in the art. The solutions preferably contain 5 to 50% resin by weight, more preferably 30-40% resin by weight.

One preferred method of spray coating PET preforms is based on the use of an apparatus such as that disclosed in U.S. Pat. No. 4,538,542 to Kennon, et al. (incorporated herein in its entirety by this reference) and sold by Nordson Corporation (Amherst, Ohio). This apparatus comprises a spray coating chamber, a drying chamber, and a conveyor for moving the preforms between the two chambers. The apparatus may further comprise an overspray recovery system.

The spray coating process begins by obtaining PET preforms, which are preferably made by an injection molding process as described above. The neck portion of each preform is clasped by an attachment means and mounted on a conveyor. The preforms are evenly spaced apart on the conveyor. The preforms are thus conveyed into the spray coating chamber wherein they pass in close proximity to a series of spray nozzles, preferably airless spray nozzles. The barrier resin-containing solvent is sprayed through the nozzles so that it impacts the outside surface of each preform as it passes through the chamber, leaving each preform covered with a wet coating layer. To aid the adherence of the barrier material and help hasten the evaporation of the solvent, the preforms may be pre-heated by methods known to those skilled in the art before they enter the spray coating chamber.

The conveyor then carries the preforms out of the spray coating chamber and into the drying chamber. The drying chamber may comprise an oven, a collection of lamps, or other source of thermal energy which provides the chamber with a temperature warm enough to aid in driving off the solvent in the wet coating layer, yet not so hot as to cause distortion in the shape of the preform itself. As the preforms pass through the drying chamber, the solvent is evaporated, leaving a barrier coating on the preforms.

3. Flame Spraying

Another preferred method of producing a coated PET preform in accordance with the present invention is flame-spraying the PET preform with powdered resin of the barrier coating material.

For the flame spraying process, the barrier material resin is used as a powder which is preferably 60 to 150 mesh, more preferably 80 to 120 mesh. A conventional flame spray apparatus, familiar to those skilled in the art, may be used, such as the Unispray Jet Gun from Thermal Polymer Systems (Angleton, Tex.). The use of other such commercially available apparatuses or other custom or modified apparatuses is contemplated as part of the present invention.

The flame-spray coating process begins by obtaining PET preforms, which are preferably made by an injection molding process as described above. The surface of the preform is preferably free of any oils, surfactants, water, mold release agents, or the like so that the barrier coating material can adhere directly to the PET. The preforms are preheated to preferably 50 to 100 C., more preferably 65 to 75 C., and then the powdered barrier resin is applied using the flame-spraying apparatus. The amount of resin deposited and, hence, the thickness of the barrier coating is determined by the amount of time that the preform resides in the flame. Once the desired amount of resin has been deposited, the preform is removed from the flame. The coated preform may then be blow-molded to form a bottle.

Barrier-coated preforms produced by flame-spraying are preferably of the type in FIG. 3 or 5. The interior of the coated preform 16 is uncoated so that any food or beverage that is placed in the container blown from the preform will be in contact with the virgin PET only. The thickness of the barrier coating 24 is preferably 0.01 to 5.0 mm, more preferably 0.5 to 2.0 mm.

EXAMPLE 2

A sample of a Phenoxy-type Thermoplastic resin, specifically a poly(hydroxyamino ether) available from Dow Chemical Company as XU19040.00L was obtained as small pellets. The pellets were ground into a powder and sieved using a 100 mesh screen according to standard processes known in the art to selectively obtain 120 to 180 mesh powder. Three clean preforms made of virgin PET of the type to form a 68 oz bottle weighing approximately 48 grams each were heated to 100 C. and then flame-sprayed using a Unispray Jet Gun. Preforms were removed from the flame at different times in order to get barrier-coatings of varying thickness. A preform left in the flame for 5 seconds was coated with 4.5 grams of resin, the preform left for 8 seconds received 8.6 grams, and the preform left for 10 seconds was coated with 11.5 grams of resin.

4. Fluidized Bed Dipping

Another method of producing barrier coated PET preforms in accordance with the present invention is fluidized bed dipping. In this process, the PET preform is dipped into a bed of powdered resin of the barrier coating material which is fluidized by a flow of air through the resin powder. In this process, the barrier material resin is a powder preferably 60 to 150 mesh, more preferably 80 to 100 mesh. Conventional fluidized bed apparatus and techniques, as known to those skilled in the art, may be used.

The fluidized bed coating process begins by obtaining PET preforms, which are preferably made by an injection molding process as described above. The surface of the preform is preferably free of any oils, surfactants, mold release agents, or the like so that the barrier coating material can adhere directly to the PET. The preforms, at a temperature of preferably 50 to 125 C., more preferably 75 to 100 C., are immersed in the fluidized powder. The preforms are preferably immersed only as high as the support ring 6, as it is generally not desired for the barrier resin to coat the interior of the preform.

The preform is removed after a period of preferably 2 to 10 seconds, more preferably 5 to 7 seconds. The preform, with a coating of powder thereon, must then be heated such as by use of an oven, flame or lamp to cause the powder to melt or flow so that it forms a smooth uniform coating. Once the coating is smoothed out by heating, the preform may then be blow-molded to form a bottle.

EXAMPLE 3

A sample of a Phenoxy-type Thermoplastic resin, specifically a PHAE available from Dow Chemical Company as XU19040.00L was obtained as small pellets. The pellets were ground into a powder and sieved using a 80 mesh screen according to standard processes known in the art to selectively obtain 80 to 100 mesh powder. Clean preforms of virgin PET weighing approximately 48 grams each were heated to 75-100 C. and then immersed in a fluidized bed containing the PHAE powder. The powder in the bed was maintained at room temperature and the air-flow rate through the bed was sufficient to fluidize the powder. Preforms were removed after 8 seconds and flame treated to melt the powder and create a uniform clear coating. The preforms were coated, on average, with 0.7 grams of resin.

5. Electrostatic Powder Spray

Another method of producing a coated PET preform in accordance with the present invention is electrostatic spraying of the PET preform using a powdered resin of the barrier coating material. In this process, the barrier material resin is used as a powder of preferably 80 to 200 mesh, more preferably 100 to 140 mesh. An electrostatic spraying apparatus, such as those known to those in the art, is used.

The electrostatic powder coating process begins by obtaining PET preforms, preferably by injection molding as described above. The surface of the preform is preferably free of any oils, surfactants, mold release agents, or the like to allow the barrier coating material to adhere directly to the PET. An electrical charge, preferably 40 to 100 Kv, more preferably 70 to 80 Kv, is placed on the powder as it exits the spray gun. A charge opposite to that of the powder may be placed on the preform, or the preform may be grounded.

The preform, at a temperature of preferably 10 to 40 C., more preferably 20 to 25 C., is sprayed for preferably 1 to 15 seconds, more preferably 3 to 5 seconds. The powder-coated preform must then be heated such as by a lamp, flame, or oven to cause the powder to melt or flow so that it forms a smooth uniform coating. Once the coating is smoothed out by heating, the preform may then be blow-molded into a bottle.

The barrier-coated preforms produced from electrostatic spraying are preferably of the type seen in FIG. 3 or 5. The barrier coating 22 is disposed only on the exterior of the preform and the interior is uncoated.

EXAMPLE 4

A sample of a Phenoxy-type Thermoplastic resin, specifically XU19040.00L (Dow Chemical Company) was obtained as small pellets. The pellets were ground into a powder and sieved to selectively obtain 120 to 140 mesh powder. Three clean injection molded preforms of virgin PET weighing approximately 48 grams were used. A grounded wire mesh insert was placed inside each preform at room temperature. No voltage was applied to the preforms. The preforms were sprayed with the powder using a standard spray gun with an applied voltage. Preforms were sprayed for 5 seconds and then flame treated. The preforms were coated, on average, with 1.6 grams of resin.

6. Overmolding

An especially preferred method of producing a coated PET preform is referred to herein generally as overmolding, and sometimes as inject-over-inject ("IOI"). The name refers to a procedure which uses injection molding to inject one or more layers of barrier material over an existing preform, preferably that which was itself made by injection molding. The terms "overinjecting" and "overmolding" are used herein to describe the coating process whereby a layer of material, preferably comprising barrier material, is injected over an existing preform. In an especially preferred embodiment, the overinjecting process is performed while the underlying preform has not yet fully solidified. Overinjecting may be used to place one or more additional layers of materials such as those comprising barrier material, recycled PET, or other materials over a coated or uncoated preform.

The overmolding is carried out by using an injection molding process using equipment similar to that used to form the uncoated preform itself. A preferred mold for overmolding, with an uncoated preform in place is shown in FIG. 9. The mold comprises two halves, a cavity half 52 and a mandrel half 54, and is shown in FIG. 9 in the closed position prior to overinjecting. The cavity half 52 comprises a cavity in which the uncoated preform is placed. The support ring 6 of the preform rests on a ledge 58 and is held in place by the mandrel half 54 which exerts pressure on the support ring 6, thus sealing the neck portion off from the body portion of the preform. The cavity half 52 has a plurality of tubes or channels 55 therein which carry a fluid. Preferably the fluid in the channels circulates in a path in which the fluid passes into an input in the cavity half 52, through the channels 55, out of the cavity half 52 through an output, through a chiller or other cooling means, and then back into the input. The circulating fluid serves to cool the mold, which in turn cools the plastic melt which is injected into the mold to form the coated preform.

The mandrel half of the mold comprises a mandrel. The mandrel 96, sometimes called a core, protrudes from the mandrel half 54 of the mold and occupies the central cavity of the preform. In addition to helping to center the preform in the mold, the mandrel 96 cools the interior of the preform. The cooling is done by fluid circulating through channels 57 in the mandrel half 54 of the mold, most importantly through the length of the mandrel 96 itself. The channels 57 of the mandrel half 54 work in a similar to the channels 55 in the cavity half 52, in that they create the portion of the path through which the cooling fluid travels which lies in the interior of the mold half.

As the preform sits in the mold cavity, the body portion of the preform is centered within the cavity and is completely surrounded by a void space 60. The preform, thus positioned, acts as an interior die mandrel in the subsequent injection procedure. The melt of the overmolding material, preferably comprising a barrier material, is then introduced into the mold cavity from the injector via gate 56 and flows around the preform, preferably surrounding at least the body portion 4 of the preform. Following overinjection, the overmolded layer will take the approximate size and shape of the void space 60.

To carry out the overmolding procedure, one preferably heats the initial preform which is to be coated to a temperature above its Tg. In the case of PET, that temperature is preferably 100 to 200 C., more preferably 180-225 C. If a temperature at or above the temperature of crystallization for PET is used, which is about 120 C., care should be taken when cooling the PET in the preform. The cooling should be sufficient to allow for the PET in the preform to take the preferred amorphous state, rather than the crystalline state. Alternatively, the initial preform used may be one which has been very recently injection molded and not fully cooled, as to be at an elevated temperature as is preferred for the overmolding process.

The coating material is heated to form a melt of a viscosity compatible with use in an injection molding apparatus. The temperature for this, the inject temperature, will differ among materials, as melting ranges in polymers and viscosities of melts may vary due to the history, chemical character, molecular weight, degree of branching and other characteristics of a material. For the preferred barrier materials disclosed above, the inject temperature is preferably in the range of about 175-325 C., more preferably 200 to 275 C. For example, for the Copolyester Barrier Material B-010, the preferred temperature is around 275 C., whereas for the PHAE XU-19040.00L the preferred temperature is around 200 C. If recycled PET is used, the inject temperature is preferably 250-300 C. The coating material is then injected into the mold in a volume sufficient to fill the void space 60. If the coating material comprises barrier material, the coating layer is a barrier layer.

The coated preform is preferably cooled at least to the point where it can be displaced from the mold or handled without being damaged, and removed from the mold where further cooling may take place. If PET is used, and the preform has been heated to a temperature near or above the temperature of crystallization for PET, the cooling should be fairly rapid and sufficient to ensure that the PET is primarily in the amorphous state when the preform is fully cooled. As a result of this process, a strong and effective bonding takes place between the initial preform and the subsequently applied coating material.

Overmolding can be also used to create coated preforms with three or more layers. In FIG. 17, there is shown a three-layer embodiment of preform of the present invention. The preform shown therein has two coating layers, a middle layer 80 and an outer layer 82. The relative thickness of the layers shown in FIG. 17 may be varied to suit a particular combination of layer materials or to allow for the making of different sized bottles. As will be understood by one skilled in the art, a procedure analogous to that disclosed above would be followed, except that the initial preform would be one which had already been coated, as by one of the methods for making coated preforms described herein, including overmolding.

a. Preferred Apparatus for Overmolding

The preferred apparatus for performing the overmolding process is based upon the use of a 330-330-200 machine by Engel (Austria), the mold portion of which comprises a stationary half and a movable half. Both halves are preferably made from hard metal. The stationary half comprises at least two mold sections, wherein each mold section comprises N (N>0) identical mold cavities, an input and output for cooling fluid, channels allowing for circulation of cooling fluid within the mold section, injection apparatus, and hot runners channeling the molten material from the injection apparatus to the gate of each mold cavity. Because each mold section forms a distinct preform layer, and each preform layer is preferably made of a different material, each mold section is separately controlled to accommodate the potentially different conditions required for each material and layer. The injector associated with a particular mold section injects a molten material, at a temperature suitable for that particular material, through that mold section's hot runners and gates and into the mold cavities. The mold section's own input and output for cooling fluid allow for changing the temperature of the mold section to accommodate the characteristics of the particular material injected into a mold section. Consequently, each mold section may have a different injection temperature, mold temperature, pressure, injection volume, cooling fluid temperature, etc. to accommodate the material and operational requirements of a particular preform layer.

The movable half of the mold comprises a turntable 102 and a plurality of cores or mandrels 96. The alignment pins guide the plate to slidably move in a preferably horizontal direction towards or away from the stationary half. The turntable may rotate in either a clockwise or counterclockwise direction, and is mounted onto the plate. The plurality of mandrels are affixed onto the turntable. These mandrels serve as the mold form for the interior of the preform, as well as serving as a carrier and cooling means for the preform during the molding operation. The cooling means in the mandrels is separate from the cooling means in the mold sections.

The mold temperature or cooling for the mold is controlled by means of circulating fluid. There is separate cooling fluid circulation for the movable half and for each of the mold sections of the stationary half Therefore, in a mold having two mold sections in the stationary half, there is separate cooling for each of the two mold sections plus separate cooling for the movable half of the mold. Analogously, in a mold having three mold sections in the stationary half, there are four separate cooling fluid circulation set ups: one for each mold section, for a total of three, plus one for the movable half. Each cooling fluid circulation set up works in a similar manner. The fluid enters the mold, flows through a network of channels or tubes inside as discussed above for FIG. 9, and then exits through an output. From the output, the fluid travels through a pump means, which keeps the fluid flowing, and a chilling means to keep the fluid within the desired temperature range, before going back into the mold.

In a preferred embodiment, the mandrels and cavities comprise a high heat transfer material, such as a beryllium, which is coated with a hard metal, such as tin or chrome. The hard coating keeps the beryllium from direct contact with the preform, as well as acting as a release for ejection and providing a hard surface for long life. The high heat transfer material allows for more efficient cooling, and thus assists in achieving lower cycle times. The high heat transfer material may be disposed over the entire area of each mandrel and/or cavity, or it may be only on portions thereof. Preferably the at least the tips of the mandrels comprise high heat transfer material.

The number of mandrels is equal to the total number of cavities, and the arrangement of the mandrels on the movable half mirrors the arrangement of the cavities on the stationary half. To close the mold, the movable half moves towards the stationary half, mating the mandrels with the cavities. To open the mold, the movable half moves away from the stationary half such that the mandrels are well clear of the block on the stationary half. After the mandrels are fully withdrawn from the mold sections, the turntable of the movable half rotates the mandrels into alignment with a different mold section. Thus, the movable half rotates 360/ (number of mold sections in the stationary half) degrees after each withdrawal of the mandrels from the stationary half. When the machine is in operation, during the withdrawal and rotation steps, there will be preforms present on some or all of the mandrels.

The size of the cavities in a given mold section will be identical, however the size of the cavities will differ among the mold sections. The cavities in which the uncoated preforms are first molded, the preform molding cavities, are smallest in size. The size of the cavities in the mold section in which the first coating step is performed are larger than the preform molding cavities, in order to accommodate the uncoated preform and still provide space for the coating material to be injected into to form the overmolded coating. The cavities in each subsequent mold section wherein additional overmolding steps are performed will be increasingly larger in size to accommodate the preform as it gets larger with each coating step.

After a set of preforms has been molded and overmolded to completion, a series of ejectors eject the finished preforms off of the mandrels. The ejectors for the mandrels operate independently, or at least there is a single ejector for a set of mandrels equal in number and configuration to a single mold section, so that only the completed preforms are ejected. Uncoated or incompletely-coated preforms remain on the mandrels so that they may continue in the cycle to the next mold section. The ejection may cause the preforms to completely separate from the mandrels to fall into a bin or onto a conveyor. Alternatively, the preforms may remain on the mandrels after ejection, after which a robotic arm or other such apparatus grasps a preform or group of preforms for removal to a bin, conveyor, or other desired location.

FIGS. 10 and 11 illustrate a schematic for an embodiment of the apparatus described above. FIG. 11 is the stationary half of the mold. In this embodiment, the block 101 has two mold sections, one comprising a set of three preform molding cavities 98 and the other comprising a set of three preform coating cavities 100. Each of the preform coating cavities 100 is preferably like that shown in FIG. 9, discussed above. Each of the preform molding cavities 98 is preferably similar to that shown in FIG. 9, in that the material is injected into a space defined by the mandrel (albeit without a preform already thereon) and the wall of the mold which is cooled by fluid circulating through channels inside the mold block. Consequently, one full production cycle of this apparatus will yield three two-layer preforms. If more than three preforms per cycle is desired, the stationary half can be reconfigured to accommodate more cavities in each of the mold sections. An example of this is seen in FIG. 14, wherein there is shown a stationary half of a mold comprising two mold sections, one comprising forty-eight preform molding cavities 98 and the other comprising forty-eight preform coating cavities 100. If a three or more layer preform is desired, the stationary half can be reconfigured to accommodate additional mold sections, one for each preform layer FIG. 10 illustrates the movable half of the mold. The movable half comprises six identical mandrels 96 mounted on the turntable 102. Each mandrel corresponds to a cavity on the stationary half of the mold. The movable half also comprises alignment pegs 94, which correspond to the receptacles 95 on the stationary half. When the movable half of the mold moves to close the mold, the alignment pegs 94 are mated with their corresponding receptacles 95 such that the molding cavities 98 and the coating cavities 100 align with the mandrels 96. After alignment and closure, half of the mandrels 96 are centered within preform molding cavities 98 and the other half of the mandrels 96 are centered within preform coating cavities 100.

The configuration of the cavities, mandrels, and alignment pegs and receptacles must all have sufficient symmetry such that after the mold is separated and rotated the proper number of degrees, all of the mandrels line up with cavities and all alignment pegs line up with receptacles. Moreover, each mandrel must be in a cavity in a different mold section than it was in prior to rotation in order to achieve the orderly process of molding and overmolding in an identical fashion for each preform made in the machine.

Two views of the two mold halves together are shown in FIGS. 15 and 16. In FIG. 15, the movable half is moving towards the stationary half, as indicated by the arrow. Two mandrels 96, mounted on the turntable 102, are beginning to enter cavities, one enters a molding cavity 98 and the other is entering a coating cavity 100 mounted in the block 101. In FIG. 16, the mandrels 96 are fully withdrawn from the cavities on the stationary side. In this figure, the cooling arrangement is shown schematically, wherein the preform molding cavity 98 has cooling circulation 106 which is separate from the cooling circulation 108 for the preform coating cavity 100 which comprises the other mold section. The two mandrels 96 are cooled by a single system 104 which links all the mandrels together. The arrow in FIG. 16 shows the rotation of the turntable 102. The turntable could also rotate clockwise. Not shown are coated and uncoated preforms which would be on the mandrels if the machine were in operation. The alignment pegs and receptacles have also been left out for the sake of clarity.

The operation of the overmolding apparatus will be discussed in terms of the preferred two mold section apparatus for making a two-layer preform. The mold is closed by moving the movable half towards the stationary half until they are in contact. A first injection apparatus injects a melt of first material into the first mold section, through the hot runners and into the preform molding cavities 98 via their respective gates to form the uncoated preforms each of which become the inner layer of a coated preform. The first material fills the void between the preform molding cavities 98 and the mandrels 96. Simultaneously, a second injection apparatus injects a melt of second material into the second mold section of the stationary half, through the hot runners and into each preform coating cavity 100 via their respective gates, such that the second material fills the void (60 in FIG. 9) between the wall of the coating cavity 100 and the uncoated preform mounted on the mandrel 96 therein.

During this entire process, cooling fluid is circulating through the three separate areas 106, 108, and 104, corresponding to the mold section of the preform molding cavities, mold section of the preform coating cavities, and the movable half of the mold, respectively. Thus, the melts and preforms are being cooled in the center by the circulation in the movable half that goes through the interior of the mandrels, as well as on the outside by the circulation in each of the cavities. The operating parameters of the cooling fluid in the first mold section containing preform molding cavities 98 are separately controlled from the operating parameters of the cooling fluid in the second mold section containing the coating cavities to account for the different material characteristics of the preform and the coating. These are in turn separate from those of the movable half of the mold which provides constant cooling for the interior of the preform throughout the cycle, whether the mold is open or closed.

The movable half then slides back to separate the two mold halves and open the mold, until all of the mandrels 96 having preforms thereon are completely withdrawn from the preform molding cavities 98 and preform coating cavities 100. The ejectors eject the coated, finished preforms off of the mandrels 96 which were just removed from the preform coating cavities. As discussed above, the ejection may cause the preforms 96 to completely separate from the mandrels and fall into a bin or onto a conveyor, or if the preforms remain on the mandrels after ejection, a robotic arm or other apparatus may grasp a preform or group of preforms for removal to a bin, conveyor, or other desired location. The turntable 102 then rotates 180 so that each mandrel 96 having an uncoated preform thereon is positioned over a preform coating cavity 100, and each mandrel from which a coated preform was just ejected is positioned over a preform molding cavity 98. Rotation of the turntable 102 may occur as quickly as 0.3 seconds. Using the alignment pegs 94, the mold halves again align and close, and the first injector injects the first material into the preform molding cavity while the second injector injects the barrier material into the preform coating cavity.

A production cycle of closing the mold, injecting the melts, opening the mold, ejecting finished barrier preforms, rotating the turntable, and closing the mold is repeated, so that preforms are continuously being molded and overmolded.

When the apparatus first begins running, during the initial cycle, no preforms are yet in the preform coating cavities 100. Therefore, the operator should either prevent the second injector from injecting the second material into the second mold section during the first injection, or allow the second material to be injected and eject and then discard the resulting single layer preform comprised solely of the second material. After this start-up step, the operator may either manually control the operations or program the desired parameters such that the process is automatically controlled.

b. Method of Making 2-Layer Preforms Using Preferred Overmolding Apparatus

Two layer preforms may be made using the preferred overmolding apparatus described above. In one preferred embodiment, the two layer preform comprises an inner layer comprising polyester and an outer layer comprising barrier material. In especially preferred embodiments, the inner layer comprises virgin PET. The description hereunder is directed toward the especially preferred embodiments of two layer preforms comprising an inner layer of virgin PET. The description is directed toward describing the formation of a single set of coated preforms of the type seen in FIG. 4, that is, following a set of preforms through the process of molding, overmolding and ejection, rather than describing the operation of the apparatus as a whole. The process described is directed toward preforms having a total thickness in the wall portion 3 of about 3 mm, comprising about 2 mm of virgin PET and about 1 mm of barrier material. The thickness of the two layers will vary in other portions of the preform, as shown in FIG. 4.

It will be apparent to one skilled in the art that some of the parameters detailed below will differ if other embodiments of preforms are used. For example, the amount of time which the mold stays closed will vary depending upon the wall thickness of the preforms. However, given the disclosure below for this preferred embodiment and the remainder of the disclosure herein, one skilled in the art would be able to determine appropriate parameters for other preform embodiments.

The apparatus described above is set up so that the injector supplying the mold section containing the preform molding cavities 98 is fed with virgin PET and that the injector supplying the mold section containing the preform coating cavities 100 is fed with a barrier material. Both mold halves are cooled by circulating fluid, preferably water, at a temperature of preferably 0-50 C., more preferably 10-15 C.

The movable half of the mold is moved so that the mold is closed. A melt of virgin PET is injected through the back of the block 101 and into each preform molding cavity 98 to form an uncoated preform which becomes the inner layer of the coated preform. The injection temperature of the PET melt is preferably 250 to 300 C., more preferably 265 to 280 C. The mold is kept closed for preferably 3 to 10 seconds, more preferably 4 to 6 seconds while the PET is cooled by the water circulating in the mold. During this time, surfaces of the preforms which are in contact with surfaces of preform molding cavities 98 or mandrels 96 begin to form a skin while the cores of the preforms remain molten and unsolidified.

The movable half of the mold is then moved so that the two halves of the mold are separated at or past the point where the newly molded preforms, which remain on the mandrels 96, are clear of the stationary side of the mold. The interior of the preforms, in contact with the mandrel 96, continues to cool. The cooling is preferably done in a manner which removes heat at a rate greater than the crystallization rate for the PET so that in the preform the PET will be in the amorphous state. The chilled water circulating through the mold, as described above, should be sufficient to accomplish this task. However, while the inside of the preform is cooling, the temperature of the exterior surface of the preform begins to rise, as it absorbs heat from the molten core of the preform. This heating begins to soften the skin on the exterior surface of the newly molded preform.

The turntable 102 then rotates 180 so that each mandrel 96 having a molded preform thereon is positioned over a preform coating cavity 100. Thus positioned, each of the other mandrels 96 which do not have molded preforms thereon, are each positioned over a preform molding cavity 98. The mold is again closed. Preferably the time between removal from the preform molding cavity to insertion into the preform coating cavity is 1 to 10 seconds, more preferably 1 to 3 seconds.

When the molded preforms are first placed into preform coating cavities 100, the exterior surfaces of the preforms are not in contact with a mold surface. Thus, the exterior skin is still softened and hot as described above because the contact cooling is only from the mandrel inside. The high temperature of the exterior surface of the uncoated preform (which forms the inner layer of the coated preform) aids in promoting adhesion between the PET and barrier layers in the finished barrier coated preform. It is postulated that the surfaces of the materials are more reactive when hot, and thus chemical interactions between the barrier material and the virgin PET will be enhanced by the high temperatures. Barrier material will coat and adhere to a preform with a cold surface, and thus the operation may be performed using a cold initial uncoated preform, but the adhesion is markedly better when the overmolding process is done at an elevated temperature, as occurs immediately following the molding of the uncoated preform.

A second injection operation then follows in which a melt of a barrier material, is injected into each preform coating cavity 100 to coat the preforms. The temperature of the melt of barrier material is preferably 160 to 300 C. The exact temperature range for any individual barrier material is dependent upon the specific characteristics of that barrier material, but it is well within the abilities of one skilled in the art to determine a suitable range by routine experimentation given the disclosure herein. For example, if the PHAE barrier material XU19040.00L is used, the temperature of the melt (inject temperature) is preferably 160 to 240 C., more preferably 200 to 220 C. If the Copolyester Barrier Material B-010 is used, the injection temperature is preferably 160 to 240 C., more preferably 200 to 220 C. During the same time that this set of preforms are being overmolded with barrier material in the preform coating cavities 100, another set of uncoated preforms is being molded in the preform molding cavities as described above.

The two halves of the mold are again separated preferably 3 to 10 seconds, more preferably 4 to 6 seconds following the initiation of the injection step. The preforms which have just been barrier coated in the preform coating cavities 100, are ejected from the mandrels 96. The uncoated preforms which were just molded in preform molding cavities 98 remain on their mandrels 96. The turntable is then rotated 180 so that each mandrel having an uncoated preform thereon is positioned over a coating cavity 100 and each mandrel 96 from which a coated preform was just removed is positioned over a molding cavity 98.

The cycle of closing the mold, injecting the materials, opening the mold, ejecting finished barrier preforms, rotating the turntable, and closing the mold is repeated, so that preforms are continuously being molded and overmolded.

One of the many advantages of using the process disclosed herein is that the cycle times for the process are similar to those for the standard process to produce uncoated preforms; that is the molding and coating of preforms by this process is done in a period of time similar to that required to make uncoated PET preforms of similar size by standard methods currently used in preform production. Therefore, one can make barrier coated PET preforms instead of uncoated PET preforms without a significant change in production output and capacity.

If a PET melt cools slowly, the PET will take on a crystalline form. Because crystalline polymers do not blow mold as well as amorphous polymers, a preform of crystalline PET would not be expected to perform as well in forming containers according to the present invention. If, however, the PET is cooled at a rate faster than the crystal formation rate, as is described herein, it will take on an amorphous form. The amorphous form is ideal for blow molding. Thus, sufficient cooling of the PET is crucial to forming preforms which will perform as needed when processed.

The rate at which a layer of PET cools in a mold such as described herein is proportional to the thickness of the layer of PET, as well as the temperature of the cooling surfaces with which it is in contact. If the mold temperature factor is held constant, a thick layer of PET cools more slowly than a thin layer. This is because it takes a longer period of time for heat to transfer from the inner portion of a thick PET layer to the outer surface of the PET which is in contact with the cooling surfaces of the mold than it would for a thinner layer of PET because of the greater distance the heat must travel in the thicker layer. Thus, a preform having a thicker layer of PET needs to be in contact with the cooling surfaces of the mold for a longer time than does a preform having a thinner layer of PET. In other words, with all things being equal, it takes longer to mold a preform having a thick wall of PET than it takes to mold a preform having a thin wall of PET.

The uncoated preforms of this invention, including those made by the first injection in the above-described apparatus, are preferably thinner than a conventional PET preform for a given container size. This is because in making the barrier coated preforms of the present invention, a quantity of the PET which would be in a conventional PET preform can be displaced by a similar quantity of one of the preferred barrier materials. This can be done because the preferred barrier materials have physical properties similar to PET, as described above. Thus, when the barrier materials displace an approximately equal quantity of PET in the walls of a preform or container, there will not be a significant difference in the physical performance of the container. Because the preferred uncoated preforms which form the inner layer of the barrier coated preforms of the present invention are thin-walled, they can be removed from the mold sooner than their thicker-walled conventional counterparts. For example, the uncoated preform of the present invention can be removed from the mold preferably after about 4-6 seconds without crystallizing, as compared to about 14-24 seconds for a conventional PET preform having a total wall thickness of about 3 mm. All in all, the time to make a barrier coated preform of the present invention is equal to or slightly greater (up to about 30%) than the time required to make a monolayer PET preform of this same total thickness.

Additionally, because the preferred barrier materials are amorphous, they will not require the same type of treatment as the PET. Thus, the cycle time for a molding-overmolding process as described above is generally dictated by the cooling time required by the PET. In the above-described method, barrier coated preforms can be made in about the same time it takes to produce an uncoated conventional preform.

The advantage gained by a thinner preform can be taken a step farther if a preform made in the process is of the type in FIG. 4. In this embodiment of coated preform, the PET wall thickness at 27 in the center of the area of the end cap 10 is reduced to preferably about $\frac{1}{3}$ of the total wall thickness. Moving from the center of the end cap out to the end of the radius of the end cap, the thickness gradually increases to preferably about $\frac{2}{3}$ of the total wall thickness, as at reference number 23 in the wall portion 3. The wall thickness may remain constant or it may, as depicted in FIG. 4, transition to a lower thickness prior to the support ring 6. The thicknesses of the various portions of the preform may be varied, but in all cases, the PET and barrier layer wall thicknesses must remain above critical melt flow thickness for any given preform design.

Using preforms of the design in FIG. 4 allows for even faster cycle times than that used to produce preforms of the type in FIG. 3. As mentioned above, one of the biggest barriers to short cycle time is the length of time that the PET needs to be cooled in the mold following injection. If a preform comprising PET has not sufficiently cooled before it is ejected from the mandrel, it will become crystalline and potentially cause difficulties during blow molding. Furthermore, if the PET layer has not cooled enough before the overmolding process takes place, the force of the barrier material entering the mold will wash away some of the PET near the gate area. The preform design in FIG. 4 takes care of both problems by making the PET layer thinnest in the center of the end cap region, which is where the gate is in the mold. The thin gate section allows the gate area to cool more rapidly, so that the uncoated PET layer may be removed from the mold in a relatively short period of time while still avoiding crystallization of the gate and washing of the PET during the second injection or overmolding phase.

The physical characteristics of the preferred barrier materials of the present invention help to make this type of preform design workable. Because of the similarity in physical properties, containers having wall portions which are primarily barrier material can be made without sacrificing the performance of the container. If the barrier material used were not similar to PET, a container having a variable wall composition as in FIG. 4 would likely have weak spots or other defects that could affect container performance.

7. Lamellar Injection Molding

A barrier layer or a barrier preform can also be produced by a process called lamellar injection molding (LIM). The essence of LIM processes is the creation of a meltstream which is composed of a plurality of thin layers. In this application, it is preferred that the LIM meltstream is comprised of alternating thin layers of PET and barrier material.

One method of lamellar injection molding is carried out using a system similar to that disclosed in several patents to Schrenk, U.S. Pat. Nos. 5,202,074, 5,540,878, and 5,628,950, the disclosures of which are hereby incorporated in their entireties by reference, although the use of that method as well as other methods obtaining similar lamellar meltstreams are contemplated as part of the present invention. Referring to FIG. 12, a schematic of a LIM system is shown. The system in FIG. 12 shows a two material system, but it will be understood that a system for three or more materials could be used in a similar fashion. The two materials which are to form the layers, at least one of which is preferably a barrier resin, are placed in separate hoppers 84 and 85, which feed two separate cylinders, 86 and 87 respectively. The materials are coextruded at rates designed to provide the desired relative amounts of each material to form a lamellar meltstream comprised of a layer from each cylinder.

The lamellar meltstream output from combined cylinders is then applied to a layer generation system 88. In the layer generation system, the two layer meltstream is multiplied into a multi-layer meltstream by repetition of a series of actions much like one would do to make a pastry dough having a number of layers. First, one divides a section of meltstream into two pieces perpendicular to the interface of the two layers. Then the two pieces are flattened so that each of the two pieces is about as long as the original section before it was halved in the first step, but only half as thick as the original section. Then the two pieces are recombined into one piece having similar dimensions as the original section, but having four layers, by stacking one piece on top of the other piece so that the sublayers of the two materials are parallel to each other. These three steps of dividing, flattening, and recombining the meltstream may be done several times to create more thinner layers. The meltstream may be multiplied by performing the dividing, flattening and recombining a number of times to produce a single melt stream consisting of a plurality of sublayers of the component materials. In this two material embodiment, the composition of the layers will alternate between the two materials. The output from the layer generation system passes through 89 and is injected into a mold to form a preform or a coating.

A system such as that in FIG. 12 to generate a lamellar meltstream may be used in place of one or both of the injectors in the overmolding process and apparatus described above. Alternatively, a barrier preform could be formed using a single injection of a LIM meltstream if the meltstream comprised barrier material. If a preform is made exclusively from a LIM meltstream or is made having an inner layer which was made from a LIM meltstream, and the container made therefrom is to be in contact with edibles, it is preferred that all materials in the LIM meltstream have FDA approval.

In one preferred embodiment, a preform of the type in FIG. 4 is made using an inject-over-inject process wherein a lamellar meltstream is injected into the barrier coating cavities 100 (FIG. 11). Such a process, in which a preform is overmolded with a lamellar meltstream, can be called LIM-over-inject. In a LIM-over-inject process to create a preform from with a beverage bottle is made by blow molding, the first or inner layer is preferably virgin PET, and the LIM meltstream is preferably a barrier material, such as PHAE, and recycled PET. Recycled PET is used in the outer layer because it will not be in contact with edibles and it is cheaper to use to make up the bulk of a container than is virgin PET or most barrier materials.

FIG. 4A shows an enlarged view of a wall section 3 of a preform of the type in FIG. 4 made by a LIM over inject process. The inner layer 110 is a single material, but the outer layer 112 is comprised of a plurality of microlayers formed by the LIM process.

An exemplary process to make such a preform is as follows. Recycled polyethylene terephthalate is applied through a feed hopper 84 to a first cylinder 86, while simultaneously, a barrier material is applied through a second feed hopper 85 to a second cylinder 87. The two materials are coextruded at rates to provide two-layer lamellar meltstream comprising preferably 60-95 wt. % recycled polyethylene terephthalate and preferably 540 wt. % barrier material. The lamellar meltstream is applied to the layer generation system 88 in which a lamellar melt stream comprising the two materials is formed by dividing, flattening and recombining the meltstream, preferably at least twice. This lamellar melt stream exits at 89 and is then injected into a mold, such as that depicted in FIG. 9. Preferably, the lamellar melt stream is injected into the preform coating cavities 100 of in an overmolding apparatus such as that in FIGS. 11 and 12 over a preform, to form a LIM-over-inject coated preform comprising a barrier layer consisting of alternating microlayers of barrier material and recycled PET.

In another exemplary process, virgin PET is applied through a feed hopper 84 to a first cylinder 86, while simultaneously, B-010 is applied through a second feed hopper 85 to a second cylinder 87. The two polymers are coextruded at rates to provide a meltstream comprising preferably 60-95 wt. % virgin polyethylene terephthalate and preferably 5-40 wt. % B-010. The two layer meltstream is applied to a layer generation system 88 in which a lamellar melt stream comprising the two materials is formed by dividing flattening and recombining the meltstream, preferably at least twice. This lamellar melt stream exits at 89 and is then injected into the preform molding cavities 98 of the preferred overmolding apparatus described above. This initial LIM preform is overinjected with recycled PET in the preform coating cavities 100 to produce a preform with an inner layer consisting of alternating microlayers of barrier material and virgin PET, and an outer layer of recycled PET. Such a process may be called inject-over-LIM.

In the multilayer preform, LIM-over-inject or inject-over-LIM embodiments, the lamellar injection system can be used to advantage to provide a plurality of alternating and repeating sublayers, preferably comprised of PET and a barrier material. The multiple layers of these embodiments of the invention offers a further safeguard against premature diffusion of gases through the sidewall of the beverage container or other food product container.

H. Formation of Preferred Containers by Blow Molding

The barrier-coated containers of the present invention are preferably produced by blow-molding the barrier-coated preforms, the creation of which is disclosed above. The barrier-coated preforms of the present invention can be blow-molded using techniques and conditions very similar, if not identical, to those by which uncoated PET preforms are blown into containers. Such techniques and conditions for blow-molding monolayer PET preforms into bottles are well known to those skilled in the art and can be used or adapted as necessary.

Generally in such a process, the preform is heated to a temperature of preferably 90 to 120 C., more preferably 100 to 105 C., and given a brief period of time to equilibrate. After equilibration, it is stretched to a length approximating the length of the final container. Following the stretching, pressurized air is forced into the preform which acts to expand the walls of the preform to fit the mold in which it rests, thus creating the container.

Although the present invention has been described in terms of certain preferred embodiments, and certain exemplary methods, it is to be understood that the scope of the invention is not to be limited thereby. Instead, Applicant intends that the scope of the invention be limited solely by reference to the attached claims, and that variations on the methods and materials disclosed herein which are apparent to those of skill in the art will fall within the scope of Applicant's invention.

What is claimed is:

1. A multilayer injection molded preform comprising:
   a body portion having a wall portion and an end cap, wherein said body portion comprises
   a first innermost layer comprising a thermoplastic polyester; and
   a second outermost layer coextensive with and directly bound to the first innermost layer in the wall portion and the end cap and comprising a thermoplastic material selected from the group consisting of (i) phenoxy-type thermoplastic, (ii) copolyester of terephthalic acid, isophthalic acid and at least one diol, and (iii) recycled polyester;
   wherein the first innermost is thinner in the end cap than in the wall portion.

2. The injection molded preform of claim 1, wherein the second layer comprises recycled polyester.

3. The injection molded preform of claim 1, wherein the wall portion of at least one of the first and second layers transitions to a lower thickness near a support ring.

4. The injection molded preform of claim 1, wherein the first layer comprises polyethylene terephthalate.

5. The injection molded preform of claim 1, wherein the second layer consists of a plurality of microlayers comprising barrier material.

6. The injection molded preform of claim 1, wherein the second layer has a thickness of about 0.01-5.0 mm.

7. The injection molded preform of claim 1, wherein at least one of said first and second layers comprises a barrier material.

8. The injection molded preform of claim 7, wherein the barrier material further comprises Nanoparticles.

9. The injection molded preform of claim 7, wherein the barrier material comprises poly(hydroxyamino ether).

10. The injection molded preform of claim 9, wherein the barrier material further comprises one or more resorcinol derivatives.

11. The injection molded preform of claim 10, wherein the resorcinol derivative comprises resorcinol diglycidyl ether.

12. The injection molded preform of claim 7, wherein the barrier material comprises a copolyester of terephthalic acid, isophthalic acid and at least one diol, wherein the at least one diol comprises ethylene glycol.

13. A multilayer injection molded preform comprising:
    a body portion having a wall portion and an end cap, wherein said body portion comprises
    a first layer comprising a thermoplastic polyester; and
    a second layer coextensive with and directly bound to the first layer in the wall portion and the end cap and comprising a thermoplastic material selected from the group consisting of (i) phenoxy-type thermoplastic, (ii) copolyester of terephthalic acid, isophthalic acid and at least one diol, and (iii) recycled polyester;
    wherein the first layer is thinner in the end cap than in the wall portion and the second layer is thinner in the wall portion than in the end cap; and
    wherein the first layer extends longitudinally above the second layer and terminates above a support ring in a single layer neck finish section, and the second layer terminates below the support ring.

14. An injection molded preform comprising:
    a body comprising wall and end cap portions, wherein the body is formed from at least a first and second layer, said first and second layers being coextensive through the wall and end cap portions and directly bound together,
    said first layer comprising a thermoplastic polyester; and
    said second layer comprising an amorphous thermoplastic material having barrier properties;
    wherein one of said first and second layers is thinner in the end cap than in the wall portion so as to facilitate the rapid removal of said layer from a mold following injection; and wherein the first layer extends longitudinally above the second layer and terminates above a support ring in a single layer neck finish section, and the second layer terminates below the support ring.

15. The injection molded preform of claim 14, wherein the second layer further comprises Nanoparticles.

16. The injection molded preform of claim 14, wherein the wall portion of at least one of the first and second layers transitions to a lower thickness near a support ring.

17. The injection molded preform of claim 14 wherein the first layer is the innermost layer of the preform.

18. The injection molded preform of claim 14, further comprising a third layer directly bound to the second layer.

19. The injection molded preform of claim 14, wherein the first layer comprises polyethylene terephthalate.

20. The injection molded preform of claim 14, wherein the amorphous thermoplastic material of the second layer is phenoxy-type thermoplastic or a copolyester of terephthalic acid, isophthalic acid and at least one diol.

21. The injection molded preform of claim 20, wherein the second layer comprises poly(hydroxyamino ether).

22. The injection molded preform of claim 21, wherein the poly(hydroxyamino ether) further comprises one or more resorcinol derivatives.

23. The injection molded preform of claim 22, wherein the resorcinol derivative comprises resorcinol diglycidyl ether.

24. The injection molded preform of claim 20, wherein the second layer comprises a copolyester of terephthalic acid, isophthalic acid and at least one diol, wherein the at least one diol comprises ethylene glycol.

25. A multilayer injection molded preform comprising:
a body portion having a wall portion and an end cap, wherein said body portion comprises
a first layer comprising a thermoplastic polyester;
a second layer coextensive with and directly bound to the first layer in the wall portion and the end cap and comprising recycled polyester;
a third layer directly bound to the second layer and comprising a barrier material;
wherein one of the first or second layers is thinner in the end cap than in the wall portion; and
wherein the first layer extends longitudinally above the second layer and terminates above a support ring in a single layer neck finish section, and the second layer terminates below the support ring.

26. The injection molded preform of claim 25, wherein the barrier material comprises poly(hydroxyamino ether).

27. The injection molded preform of claim 25, wherein the barrier material comprises a copolyester of terephthalic acid, isophthalic acid and at least one diol, wherein the at least one diol comprises ethylene glycol.

28. The injection molded preform of claim 25, wherein the wall portion of at least one of the first, second, or third layers transitions to a lower thickness near a support ring.

29. The injection molded preform of claim 25, wherein the first layer comprises polyethylene terephthalate.

30. The injection molded preform of claim 25, further comprising a fourth layer directly bound to the third layer.

31. The injection molded preform of claim 25, wherein the second layer has a thickness of about 0.01-5.0 mm.

32. The injection molded preform of claim 25, wherein the barrier material further comprises one or more resorcinol derivatives.

33. The injection molded preform of claim 32, wherein the resorcinol derivative comprises resorcinol diglycidyl ether.

34. A multilayer injection molded preform comprising:
a body portion having a wall portion and an end cap, wherein said body portion comprises
a first layer comprising polyethylene terephthalate;
a second layer coextensive with and directly bound to the first layer in the wall portion and the end cap and comprising recycled polyethylene terephthalate;
a third layer directly bound to the second layer and comprising poly(hydroxyamino ether);
wherein the one of the first or second layers is thinner in the end cap than in the wall portion; and
wherein the first layer extends longitudinally above the second layer and terminates above a support ring in a single layer neck finish section, and the second layer terminates below the support ring.

35. The injection molded preform of claim 34, wherein the wall portion of at least one of the first, second, or third layers transitions to a lower thickness near a support ring.

36. The injection molded preform of claim 34, wherein the first layer is the innermost layer.

37. The injection molded preform of claim 34, wherein the second layer has a thickness of about 0.01-5.0 mm.

38. The injection molded preform of claim 34, wherein the poly(hydroxyamino ether) further comprises one or more resorcinol derivatives.

39. The injection molded preform of claim 38, wherein the resorcinol derivative comprises resorcinol diglycidyl ether.

* * * * *